United States Patent
Noguera Serra et al.

(10) Patent No.: US 11,288,222 B1
(45) Date of Patent: Mar. 29, 2022

(54) MULTI-DIE INTEGRATED CIRCUIT WITH DATA PROCESSING ENGINE ARRAY

(71) Applicant: Xilinx, Inc., San Jose, CA (US)

(72) Inventors: Juan J. Noguera Serra, San Jose, CA (US); Tim Tuan, San Jose, CA (US); Sridhar Subramanian, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/035,368

(22) Filed: Sep. 28, 2020

(51) Int. Cl.
 G06F 13/40 (2006.01)
 G06F 13/16 (2006.01)

(52) U.S. Cl.
 CPC ...... *G06F 13/4027* (2013.01); *G06F 13/1668* (2013.01)

(58) Field of Classification Search
 None
 See application file for complete search history.

(56) References Cited

U.S. PATENT DOCUMENTS

| | | | |
|---|---|---|---|
| 3,776,137 A | 12/1973 | Abbott | |
| 4,876,641 A | 10/1989 | Cowley | |
| 6,091,263 A | 7/2000 | New et al. | |
| 6,150,839 A | 11/2000 | New et al. | |
| 6,204,687 B1 | 3/2001 | Schultz et al. | |
| 6,462,579 B1 | 10/2002 | Camilleri et al. | |
| 6,526,557 B1 | 2/2003 | Young et al. | |
| 6,759,869 B1 | 7/2004 | Young et al. | |
| 6,810,514 B1 | 10/2004 | Alfke et al. | |
| 6,836,842 B1 | 12/2004 | Guccione et al. | |
| 6,907,595 B2 | 6/2005 | Curd et al. | |
| 7,024,651 B1 | 4/2006 | Camilleri et al. | |
| 7,057,413 B1 | 6/2006 | Young et al. | |
| 7,124,338 B1 | 10/2006 | Mark et al. | |
| 7,224,184 B1 | 5/2007 | Levi et al. | |
| 7,302,625 B1 | 11/2007 | Payakapan et al. | |
| 7,394,288 B1 | 7/2008 | Agarwal | |
| 7,477,072 B1 | 1/2009 | Kao et al. | |
| 7,478,357 B1 | 1/2009 | Mason et al. | |
| 7,482,836 B2 | 1/2009 | Levi et al. | |
| 7,509,617 B1 | 3/2009 | Young | |
| 7,518,396 B1 | 4/2009 | Kondapalli et al. | |
| 7,546,572 B1 | 6/2009 | Ballagh et al. | |
| 7,619,442 B1 | 11/2009 | Mason et al. | |
| 7,640,527 B1 | 12/2009 | Dorairaj et al. | |

(Continued)

OTHER PUBLICATIONS

Stocksdale et al., Architecting HBM as a High Bandwidth, High Capacity, Self-Managed Last-Level Cache, Nov. 2017, PDSW-DSICS' 17 Denver, Co, USA (Year: 2017).
Bilski et al., "Device With Data Processing Engine Array", U.S. Appl. No. 15/944,307, filed Apr. 3, 2018, 123 pages (A copy is not provided as this application is available to the Examiner).

(Continued)

*Primary Examiner* — Michael Sun
(74) *Attorney, Agent, or Firm* — Kevin T. Cuenot

(57) ABSTRACT

A multi-die integrated circuit (IC) can include an interposer and a first die coupled to the interposer. The first die can include a data processing engine (DPE) array, wherein the DPE array includes a plurality of DPEs and a DPE interface coupled to the plurality of DPEs. The DPE interface has a logical interface and a physical interface. The multi-die IC also can include a second die coupled to the interposer. The second die can include a die interface. The DPE interface and the die interface are configured to communicate through the interposer.

19 Claims, 18 Drawing Sheets

(56) References Cited

U.S. PATENT DOCUMENTS

| | | | |
|---|---|---|---|
| 7,724,815 B1 | 5/2010 | Raha et al. | |
| 7,746,099 B1 | 6/2010 | Chan et al. | |
| 8,045,546 B1 | 10/2011 | Bao et al. | |
| 8,102,188 B1 | 1/2012 | Chan et al. | |
| 8,250,342 B1 | 8/2012 | Kostamov et al. | |
| 8,359,448 B1 | 1/2013 | Neuendorffer | |
| 8,415,974 B1 | 4/2013 | Lysaght | |
| 8,719,750 B1 | 5/2014 | Balzli, Jr. | |
| 8,796,539 B2 | 8/2014 | Asaumi et al. | |
| 8,928,351 B1 | 1/2015 | Konduru | |
| 9,035,443 B2 * | 5/2015 | Bemanian | G11C 5/04 257/686 |
| 9,081,634 B1 | 7/2015 | Simkins et al. | |
| 9,324,397 B1 * | 4/2016 | Desai | G11C 7/22 |
| 9,436,785 B1 | 9/2016 | Javre | |
| 9,722,613 B1 | 8/2017 | Schultz et al. | |
| 9,990,241 B2 * | 6/2018 | Dobbs | G06F 15/8038 |
| 10,637,462 B1 | 4/2020 | Pulipati et al. | |
| 2008/0082759 A1 | 4/2008 | Pong | |
| 2014/0006751 A1 | 1/2014 | Aliseychik et al. | |
| 2014/0267334 A1 | 9/2014 | Duluk, Jr | |
| 2016/0011996 A1 | 1/2016 | Asaad et al. | |
| 2016/0344629 A1 * | 11/2016 | Gray | H04L 49/106 |
| 2017/0220499 A1 * | 8/2017 | Gray | G06F 13/36 |
| 2017/0315944 A1 | 11/2017 | Mayer et al. | |
| 2018/0096735 A1 * | 4/2018 | Pappu | G11C 29/022 |
| 2019/0303311 A1 | 10/2019 | Bilski et al. | |
| 2019/0303328 A1 | 10/2019 | Bilski et al. | |
| 2020/0294180 A1 * | 9/2020 | Koker | G06T 1/20 |
| 2020/0334196 A1 * | 10/2020 | Nassif | G06F 9/3869 |

OTHER PUBLICATIONS

Xilinx, Inc., "AXI4-Stream Internconnect v1.1, LogiCORE IP Product Guide," PG035, Vivado Design Suite.Chap. 2: Product Specification, Chap. 3: Designing With the Core, Oct. 4, 2017, 44 pg., Xilinx, Inc., San Jose, California, USA.

Mellanox, "Bluefield Multicore System on Chip," copyright 2017 ,4 pp., Mellanox Technologies, Sunnyvale, California, USA.

Mellanox, "NP-5 Network Processor," copyright 2107, 2 pp., Mellanox Technologies, Sunnyvale, California, USA.

Mellanox, "Tile-Gx672 Processor," PB041, Feb. 14, 2015, 2 pp., Mellanox Technologies, Sunnyvale, California, USA.

Kalray, "Kalray NVMe-oF Target Controller Solutions," Dec. 18, 2017, 14 pp., Kalray Inc., Los Altos, California, USA.

EZchip, "Tile-Gx72 Processor," PB041, Feb. 14, 2015, 2 pp., EZchip Semiconductor, Inc., San Jose, California, USA.

Schooler, Richard, "Tile Processors: Many-Core for Embedded and Cloud Computing," Sep. 15, 2010, 35 pp., 14th Annual Workshop on High Performance Embedded Computing (HPEC '10).

Doud, Bob, "Accelerating the Data Plane with the Tile-Mx Manycore Processor," Feb. 25, 2015, 19 pp., Linley Data Center Conference, EZchip Semiconductor, Inc., San Jose, California, USA.

Wentzlaff, David et al., "On-Chip Interconnection Architecture of the Tile Processor," IEEE Micro, Nov. 12, J007, pp. 15-31, vol. 27, Issue 5, IEEE Computer Society Press, Los Alamitos, California, USA.

Kalray, "MPPA Processors for Autonomous Driving," May 25, 2017, 18 pp., Kalray Inc., Los Altos, California, USA.

Kalray, "Deep Learning for High-Performance Embedded Applications," 19 pp., Kalray Inc., Los Altos, California, USA.

Xilinx, UltraScale Architecture DSP Slice, UG579, Oct. 18, 2017, 74 pp., Xilinx, Inc., San Jose, California, USA.

* cited by examiner

MULTI-DIE INTEGRATED CIRCUIT WITH DATA PROCESSING ENGINE ARRAY

TECHNICAL FIELD

This disclosure relates to integrated circuits (ICs) and, more particularly, to multi-die ICs including a data processing engine array.

BACKGROUND

Integrated circuits (ICs) may be implemented using a variety of different architectures. A single die architecture is one where a single die is included within a package. The die may be homogeneous in that the die includes a plurality of similar or like circuits. In other cases, the die may be heterogeneous in that the die includes a variety of different types of circuits and/or systems. A multi-die architecture is one where a plurality of dies are included in a single package. Within the package, the dies are communicatively linked.

SUMMARY

In one aspect, a multi-die integrated circuit (IC) includes an interposer and a first die coupled to the interposer. The first die includes a data processing engine (DPE) array, wherein the DPE array includes a plurality of DPEs and a DPE interface coupled to the plurality of DPEs. The DPE interface has a logical interface and a physical interface. The multi-die IC also can include a second die coupled to the interposer. The second die can include a die interface. The DPE interface and the die interface are configured to communicate through the interposer.

In another aspect, a multi-die IC includes a package substrate, a first die coupled to the package substrate, wherein the first die is configured as an interconnect bridge, and a second die coupled to the package substrate and the first die. The second die includes a DPE array, wherein the DPE array includes a plurality of DPEs and a DPE interface coupled to the plurality of DPEs. The DPE interface has a logical interface and a physical interface. The multi-die IC also can include a third die coupled to the package substrate and the first die, wherein the third die includes a die interface. The DPE interface and the die interface are configured to communicate through the first die.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1A:
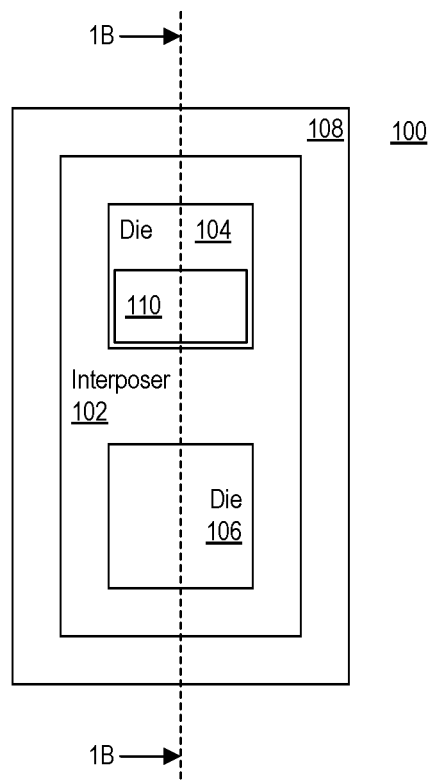
FIGS. 1A and 1B illustrate an example implementation of a device having multiple dies.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to multi-die ICs that include a data processing engine (DPE) array. A DPE array refers to a plurality of hardwired and configurable circuit blocks referred to as data processing engines (DPEs) in combination with a DPE interface. Each DPE may include a core that is capable of performing data processing operations in combination with a memory module. The DPEs within the DPE array are capable of communicating with one another through a variety of different mechanisms. In one aspect, the DPEs are capable of communicating with one another via a shared memory architecture where cores are capable of accessing the memory module in the same DPE and one or more other memory modules located in other, different DPEs. In another aspect, DPEs are capable of communicating with one another via stream switches capable of conveying data streams among the DPEs. In still another aspect, the cores of the DPE array may be directly connected by cascade connections that allow one core to send data from an internal register of the core directly to one or more other cores of other DPEs in the DPE array.

The DPE interface implements circuitry through which one or more other circuits communicate with the DPE array. These different circuits may be implemented in the same die as the DPE array, in other dies within the same package as the DPE array, or external to the package including the DPE array. For example, in the context of a device implemented using a plurality of dies where one (or more) of the dies includes a DPE array, the DPE interface facilitates communication with other circuits on the same die, one or more circuits implemented in a different die of the device, with circuits external to the package that includes the DPE array, or with any combination of the foregoing.

The DPE interface of the DPE array may include a logical interface and a physical interface. The logical interface may be implemented using a tiled architecture where each tile is capable of communicating with a subset of DPEs of the DPE array. The physical interface may be implemented using one or more different architectures as described herein with reference to the figures. In some cases, the physical interface may be implemented using a standardized interface that allows different types of dies to be included in the package and communicate with the DPE array using the standardized interface.

By implementing the DPE array in a particular die, or in its own dedicated die, and including other dies of varying types in the same package, significant flexibility is provided to IC designers. In this regard, the inventive arrangements described within this disclosure provide various advantages over other types of monolithic, single die architectures. For example, the die implementing the DPE array may be implemented using a particular type of process technology (e.g., feature size, technology node, or process node) while other dies communicatively linked with the DPE array may be implemented using a different process technology. The term "process technology" means a specific semiconductor manufacturing process and the design rules for that specific semiconductor manufacturing process. Different process technologies often imply different circuit generations and architectures where, in general, the smaller the technology node, in reference to the process technology, the smaller the feature size of the electronic components.

In one or more example implementations, the different dies of the package may be included in different power domains. A power domain refers to circuitry that is powered by a same power supply or power rail. Different power domains may have differing voltage potentials and may be powered on and/or off independently of other power domains. In the example implementations described herein, each die may be powered on or off independently of the other die or dies.

In one or more example implementations, the different dies of the package may be included in different clock domains. A clock domain refers to circuitry that is powered by a same clock source. Different clock domains may have different clock sources and, as such, use clock signals that are independent of one another. For example, clock signals of different clock domains may have different clock frequencies and/or phases. In the example implementations described herein, each die may be clocked by a different clock source and, as such, operate based on clock signals of differing frequencies and/or phases.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1B:
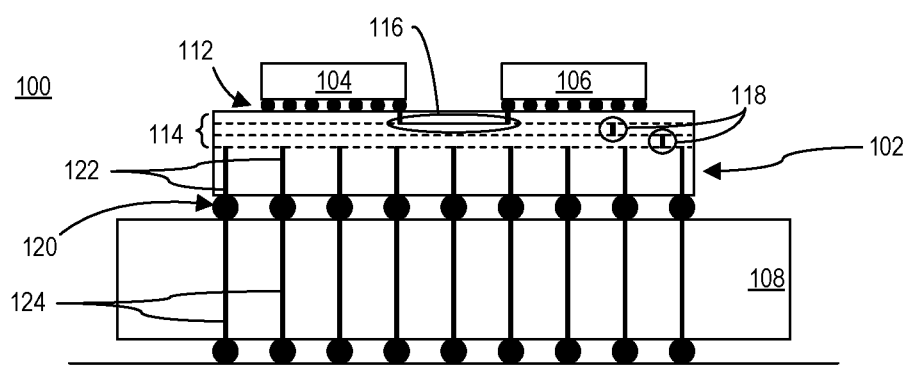

FIGS. 1A and 1B, taken collectively, illustrate an example implementation of an IC 100. For purposes of discussion, FIGS. 1A and 1B may be referred to collectively as "FIG. 1." In the example of FIG. 1, IC 100 is implemented as a multi-die IC. Further, one or more of the dies includes a DPE array 110. Within this disclosure, the term "multi-die IC" means an integrated circuit implemented to include two or more dies communicatively linked and included within a single package.

FIG. 1A illustrates a topographical view of IC 100. In the example of FIG. 1A, IC 100 is implemented as a "stacked die" type of device formed by stacking multiple dies. IC 100 includes an interposer 102, a die 104, a die 106, and a package substrate 108. Each of dies 104 and 106 is attached to a surface, e.g., a top surface, of interposer 102. In one aspect, dies 104 and 106 are attached to interposer 102 using flip-chip technology. Interposer 102 is attached to a top surface of package substrate 108.

In general, interposer 102 is an intermediate die disposed between dies 104, 106 and package substrate 108. Interposer 102 is implemented to provide interconnection, routing, and/or a ground/power plane. Package substrate 108 provides the package with mechanical base support and provides an electrical interface for connecting to nodes external to the package. IC 100 may include a cap portion that is not shown in FIG. 1 or 2 for ease of illustration.

In the example of FIG. 1A, interposer 102 is a die having a planar surface on which dies 104 and 106 are horizontally stacked. As shown, dies 104 and 106 are located on the planar surface of interposer 102 side-by-side. The number of dies shown on interposer 102 in FIG. 1A is for purposes of illustration and not limitation. In other example implementations, more than two dies may be mounted on interposer 102.

Interposer 102 provides a common mounting surface and electrical coupling for each of dies 104 and 106. The manufacturing of interposer 102 may include one or more process steps that allow the deposition of one or more conductive layers that are patterned to form wires. These conductive layers may be formed of aluminum, gold, copper, nickel, various silicides, and/or other suitable material. Interposer 102 may be manufactured using one or more additional process steps that allow the deposition of one or more dielectric or insulating layer(s) such as, for example, silicon dioxide. Interposer 102 also may include vias and through vias (TVs). TVs may be through silicon vias (TSVs), through glass vias (TGVs), or other via structures depending upon the particular materials used to implement interposer 102 and the substrate thereof. In the case where interposer 102 is implemented as a passive die, interposer 102 may only have various types of solder bumps, vias, wires, TVs, and under bump metallization (UBM). In the case where interposer 102 is implemented as an active die, interposer 102 may include additional process layers forming one or more active devices in reference to electrical devices such as transistors, diodes, etc., that include P-N junctions.

Die 104 may be implemented as an active die and include one or more DPE arrays 110. An active die is a die that includes one or more active devices. In one aspect, die 104 may include only a DPE array 110 (e.g., only DPE array 110 inclusive of any circuitry necessary to communicate with other circuits located off-die 104). In another aspect, die 104 may include DPE array 110 and additional circuit blocks capable of performing other functions. Die 106 may be implemented as a passive die or an active die. For purposes of illustration, die 104 may include one or more DPE arrays 110 while die 106 implements one or more different subsystems. Example subsystems are described herein. In one aspect, die 106 may also include one or more DPE arrays 110. The examples provided herein are for purposes of illustration and are not intended to be limiting. IC 100, for example, may include more than two dies where the dies are of different types and/or provide different functions than described within this disclosure.

FIG. 1B is a cross-sectional side view of IC 100 of FIG. 1A. FIG. 1B illustrates a view of IC 100 from FIG. 1A taken along cut-line 1B-1B. Each of dies 104 and 106 is electrically and mechanically coupled to a first planar surface of interposer 102 via solder bumps 112. In one example, solder bumps 112 are implemented as micro-bumps. Still, any of a variety of other techniques may be used to attach dies 104 and 106 to interposer 102. For example, bond wires or edge wires may be used to mechanically and electrically attach dies 104 and 106 to interposer 102. In another example, an adhesive material may be used to mechanically attach dies 104 and 106 to interposer 102. The attachment of dies 104 and 106 to interposer 102 using solder bumps 112, as illustrated within FIG. 1B, is provided for purposes of illustration and is not intended as a limitation.

Interposer 102 includes one or more conductive layers 114 illustrated as dashed or dotted lines in interposer 102. Conductive layers 114 are implemented using any of a variety of metal layers such as those previously described. Conductive layers 114 are processed to form patterned metal layers that implement wires 116 of interposer 102. A wire that couples at least two different dies, e.g., dies 104 and 106, is referred to as an inter-die wire. In the example of FIG. 1B, wires 116, formed of the patterned metal layers 114 within interposer 102, are inter-die wires. Wires 116 pass inter-die signals between dies 104 and 106. For example, each of wires 116 couples a solder bump 112 beneath die 104 with a solder bump 112 beneath die 106, thereby allowing the exchange of inter-die signals between dies 104 and 106. Wires 116 may be data wires. In another aspect, wires 116 may include one or more power wires. A power wire may be a wire carrying a voltage potential or a wire having a ground or reference voltage potential.

Different ones of conductive layers 114 and wires 116 may be coupled together using vias 118. In general, a via structure is used to implement a vertical conductive path. A vertical conductive path refers to a conductive path that is perpendicular to a process layer of the device. In this regard, the vertical portions of wires 116 that contact solder bumps 112 are implemented as vias 118. The use of multiple conductive layers to implement interconnects within interposer 102 allows a greater number of signals to be routed and more complex routing of signals to be achieved within interposer 102.

TVs 122 are vias that form an electrical connection that vertically transverses, e.g., extends through a substantial portion, if not the entirety of, interposer 102. TVs 122, like wires and vias, may be formed of any of a variety of different conductive materials including, but not limited to, copper, aluminum, gold, nickel, various silicides, and/or other suitable materials. As pictured, each of TVs 122 extends from a bottom surface of interposer 102 up to a conductive layer 114 of interposer 102. TVs 122 further may be coupled to a solder bump 112 through one or more conductive layers 114 in combination with one or more vias 118.

Solder bumps 120 can be used to mechanically and electrically couple a second planar surface of interposer 102 to package substrate 108. In particular example implementations, solder bumps 120 are implemented as controlled collapse chip connection (C4) balls. Package substrate 108 includes conductive paths 124 that couple different ones of solder bumps 120 to one or more nodes beneath package substrate 108 and to other circuit structures such as a circuit board. Accordingly, one or more of solder bumps 120 couple circuitry within interposer 102 to nodes external to IC 100 through circuitry or wiring within package substrate 108.

Figure 2A:
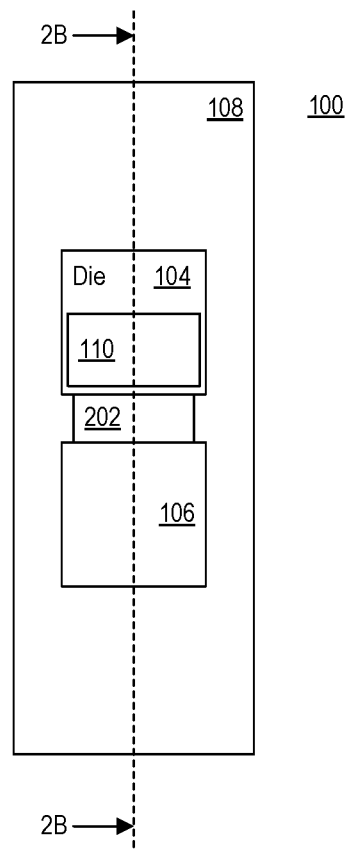
FIGS. 2A and 2B illustrate another example implementation of a device having multiple dies.
Figure 2B:
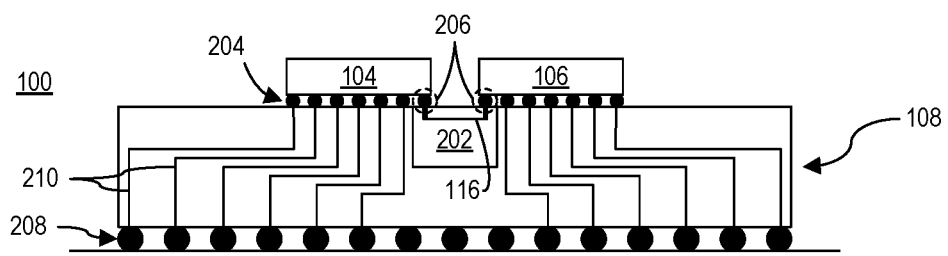

FIGS. 2A and 2B, taken collectively, illustrate another example implementation of IC 100. For purposes of discussion, FIGS. 2A and 2B may be referred to collectively as "FIG. 2." In the example of FIG. 2, IC 100 is implemented as a multi-die IC. Dies 104 and 106 may be implemented as described in connection with FIG. 1. For example, die 104 may be an active die that includes one or more DPE array(s) 110. Circuitry of die 104 may include only DPE array 110 inclusive of any circuitry necessary to communicate nodes located outside of die 104. In another example, die 104 may include DPE array 110 and additional circuitry. Die 106 may be passive or active. Die 106 also may include one or more DPE arrays.

FIG. 2A illustrates a topographical view of IC 100. In the example of FIG. 2A, dies 104 and 106 are communicatively linked by a bridge die 202. Bridge die 202 may be embedded within package substrate 108. An example of a bridge die 202 is the Embedded Multi-Die Interconnect Bridge (EMIB) available from the Intel Corporation of Santa Clara, Calif. It should be appreciated that the example bridge die provided herein is for purposes of illustration and not limitation.

Package substrate 108, including bridge die 202, provides a common mounting surface and electrical coupling for each of dies 104 and 106. Bridge die 202 implements interconnect circuitry, e.g., one or more patterned metal layers, capable of communicatively linking dies 104 to die 106. In one aspect, bridge die 202 is a passive die. In another aspect, bridge die 202 is an active die. Dies 104 and 106 are located side-by-side on the planar surface formed of package substrate 108 and bridge die 202. The number of dies shown in FIG. 2A is for purposes of illustration and not limitation. In other example implementations, more than two dies may be mounted on package substrate 108 and communicatively linked by additional bridge dies 202.

In the example of FIG. 2A, die 104 may be implemented as an active die that includes one or more DPE arrays 110. Die 106 may be implemented as a passive die or an active die. Die 106 may configured to implement any of the different subsystems described herein including one or more additional DPE arrays. The examples provided herein are for purposes of illustration and are not intended to be limiting. For example, IC 100 of FIG. 2 may include more than two dies where the dies are of different types and/or functions.

FIG. 2B is a cross-sectional side view of IC 100 of FIG. 2A. FIG. 2B illustrates a view of IC 100 from FIG. 2A taken along cut-line 2B-2B. Each of dies 104 and 106 is electrically and mechanically coupled to a first planar surface of package substrate 108 and to a first surface of bridge circuit 202 via solder bumps 204 and 206. In one example, solder bumps 204 and/or 206 are implemented as micro-bumps. In one aspect, the solder bumps used to connect die 104 and die 106 to package substrate 108 may be sized larger and/or have larger spacing than those used to connect die 104 and die 106 to bridge die 202. For example, solder bumps 206 may be spaced closer together than solder bumps 204.

Bridge die 202 implements the circuitry that communicatively links die 104 with die 106. Accordingly, signals exchanged between dies 104 and 106 are conveyed through bridge die 202. In this regard, inter-die wires 116 in the example of FIG. 2B are implemented within bridge die 202. In one example implementation, bridge die 202 includes short interconnect wires to communicatively link die 104 to die 106. Bridge die 202 does not include any TVs to enable communication between die 104 to solder bumps 208 or communication between die 106 and solder bumps 208. That is, bridge die 202 is reserved and utilized solely for communication between dies 104 and 106 and does not provide any access by die 104 or die 106 to nodes external to IC 100.

In the example of FIG. 2B, dies 104 and 106 communicate with circuitry external to the package, e.g., via solder bumps 208, by way of package traces 210. In an example where bridge die 202 is implemented as an active die, bridge die may be coupled to one or more of solder bumps 208 by way of one or more additional package traces 210 not shown in FIG. 2B.

In an example implementation, IC 100, as described in connection with FIGS. 1 and/or 2, may be implemented so that dies 104 and 106 are on a same power domain. In another example implementation, dies 104 and 106 of FIGS. 1 and/or 2 may be implemented in different power domains and may be powered on and off independently of one another. Further, as discussed, dies 104 and 106, when implemented in different power domains, are capable of operating at different voltage levels. In operating at different voltage levels, dies 104 and 106, interposer 102, and/or bridge die 202 may include suitable interface circuitry allowing signals to pass between the different power domains.

In another example implementation, IC 100, as described in connection with FIGS. 1 and/or 2, may be implemented so that dies 104 and 106 operate as part of a same clock domain. Accordingly, dies 104 and 106 of FIGS. 1 and/or 2 may be implemented in different clock domains and, as such, may be clocked at different frequencies.

In an example implementation, IC 100, as described in connection with FIGS. 1 and/or 2, may be implemented so that dies 104, 106, interposer 102, and/or bridge die 202 are implemented using different process technologies (e.g., with different features sizes). In one example, die 104 including DPE array 110 may be implemented using a 3 nm process technology while die 106 is implemented using a 16 nm technology.

Figure 3:
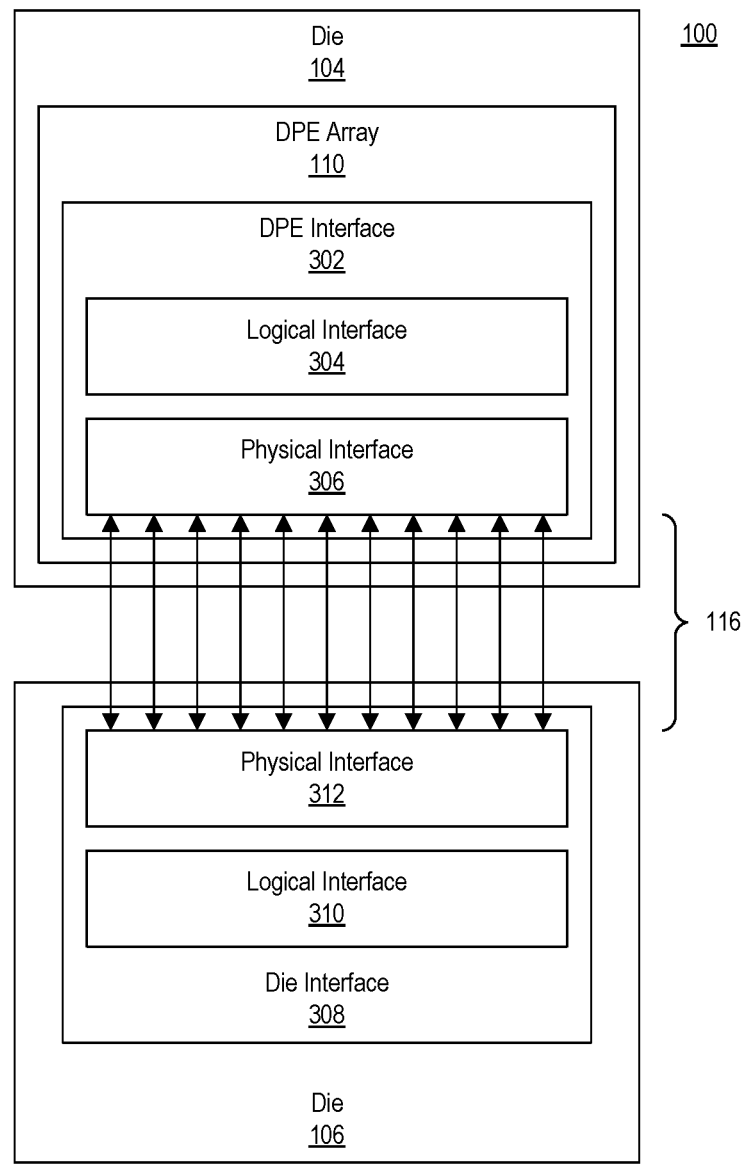
FIG. 3 illustrates another example implementation of a device having multiple dies.

FIG. 3 illustrates another example of IC 100. In the example of FIG. 3, only dies 104 and 106 are illustrated. In one aspect, dies 104 and 106 may be coupled by way of inter-die wires 116 using an interposer as described in connection with FIG. 1. In another aspect, dies 104 and 106 may be coupled by way of inter-die wires 116 using a bridge die embedded in a package substrate as described in connection with FIG. 2.

Die 104 includes a DPE array 110. The DPE array 110 includes a DPE interface 302 having a logical interface 304 and a physical interface 306. Die 106 includes a die interface 308 having a logical interface 310 and a physical interface 312. Inter-die wires 116 may connect physical interface 306 with physical interface 312. Inter-die wires 116 may be implemented in an interposer or in a bridge die as previously discussed.

In the example of FIG. 3, physical interface 306 may be implemented using one or more different technologies as described herein in greater detail. In an example implementation, physical interface 306 is implemented as a parallel interface having one or more channels. In some cases, the channels may operate independently of one another and use separate clocking. Examples of parallel interfaces may include, but are not limited to, an implementation using one or more Laguna sites (as available from Xilinx, Inc. of San Jose, Calif.) and an implementation using one or more High Bandwidth Memory (HBM) interfaces. In another example implementation, physical interface 306 may be implemented using one or more high speed serial transceivers. Such transceivers are capable of sending and receiving serialized data at speeds in the gigabit range.

Figure 4:
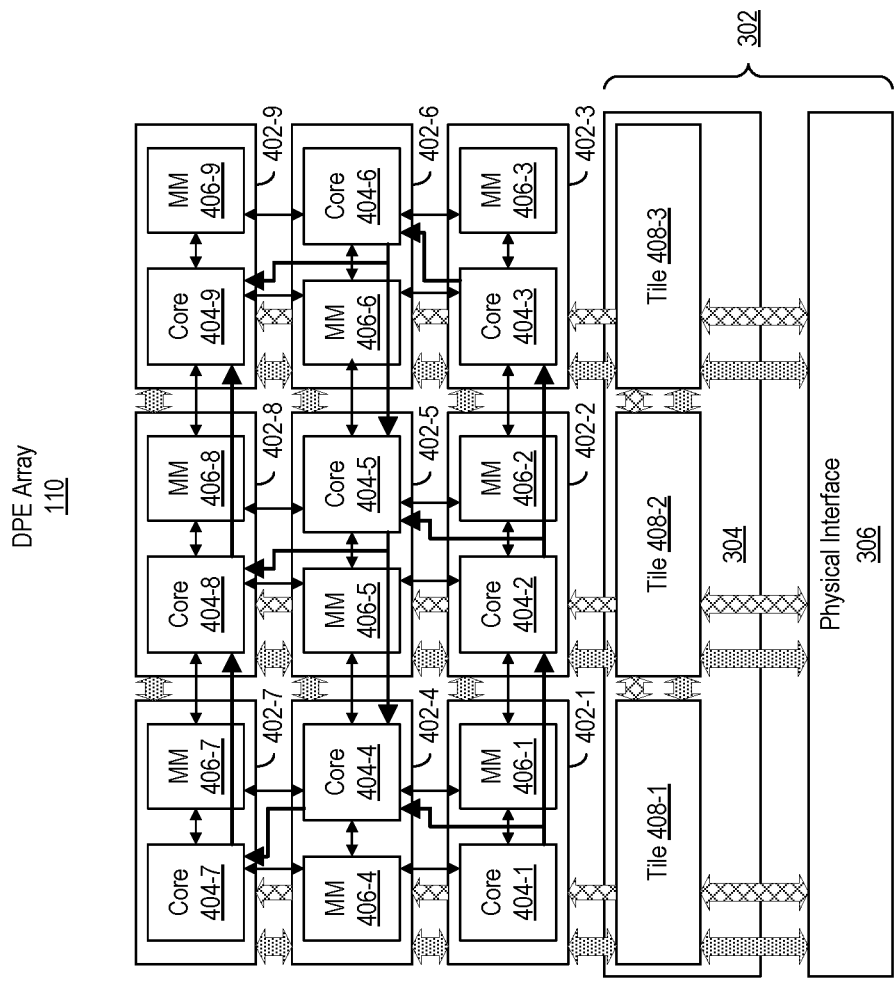
FIG. 4 illustrates an example implementation of a data processing engine (DPE) array.
Figure 4:
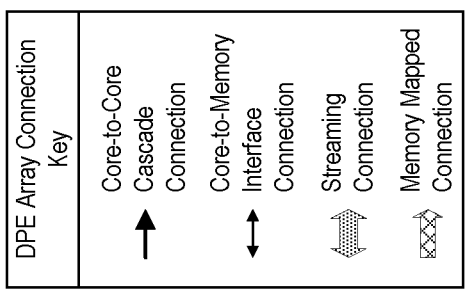

FIG. 4 illustrates an example implementation of DPE array 110. In the example of FIG. 4, DPE array 110 is implemented as a plurality of interconnected and programmable DPEs 402. DPEs 402 may be arranged in an array and are hardwired. Each DPE 402 can include one or more cores 404 and a memory module (abbreviated "MM" in FIG. 4) 406. In one aspect, each core 404 is capable of executing program code (e.g., computer readable or executable instructions) stored in a core-specific program memory contained within each respective core (not shown). Each core 404 is capable of directly accessing the memory module 406 within the same DPE 402 and the memory module 406 of any other DPE 402 that is adjacent to the core 404 of the DPE 402 in the up, down, left, and right directions. For example, core 404-5 is capable of directly reading and/or writing (e.g., via respective memory interfaces not shown) memory modules 406-5, 406-8, 406-6, and 406-2. Core 404-5 sees each of memory modules 406-5, 406-8, 406-6, and 406-2 as a unified region of addressable memory (e.g., as a part of the local memory accessible to core 404-5). This facilitates data sharing among different DPEs 402 in DPE array 110. In other examples, core 404-5 may be directly connected to memory modules 406 in other DPEs.

DPEs 402 are interconnected by programmable DPE interconnects. The programmable DPE interconnects, taken collectively, form one or more different and independent networks. For example, the programmable DPE interconnects may collectively form a DPE interconnect network having a streaming network formed of streaming connections (shaded arrows) and a memory mapped network formed of memory mapped connections (cross-hatched arrows).

Loading configuration data into control registers of DPEs 402 by way of the memory mapped connections allows each DPE 402 and the components therein to be controlled independently. DPEs 402 may be enabled/disabled on a per-DPE basis. Each core 404, for example, may be configured to access the memory modules 406 as described or only a subset thereof to achieve isolation of a core 404 or a plurality of cores 404 operating as a cluster. Each streaming connection may be configured to establish logical connections between only selected ones of DPEs 402 to achieve isolation of a DPE 402 or a plurality of DPEs 402 operating as a cluster. Because each core 404 may be loaded with program code specific to that core 404, each DPE 402 is capable of implementing one or more different kernels therein.

In other aspects, the programmable DPE interconnects within DPE array 110 may include additional independent networks such as a debug network and an event broadcast network, each being independent of one another and independent (e.g., distinct and separate from) the streaming connections and the memory mapped connections. In some aspects, the debug network is formed of memory mapped connections and/or is part of the memory mapped network.

Cores 404 may be directly connected with one or more adjacent cores 404 via cascade connections. In one aspect, cascade connections are unidirectional and direct connections between cores 404. In general, cascade connections are direct core-to-core connections that allow one core 404 to share data directly with another core 404. For example, through a cascade connection, content stored in an internal register of a core 404-2, can be provided directly to core 404-3 or directly to core 404-5. Similarly, through a cascade connection, core 404-5 is capable of directly receiving content from the internal register of core 404-6 or content from the internal register of core 404-2.

In an example implementation, the core 404 that is sending the content (e.g., the source core) is capable of sending content directly from the internal register over the cascade connection. Similarly, the content may be received directly in the internal register of the receiving core (e.g., the target core). In an example implementation, the internal register may be an accumulation register of the cores or another internal register that may connect (e.g., directly) and/or feed the accumulation register. Each of the cascade connections may be independently, e.g., separately, enabled or disabled by loading configuration data into control registers of the respective DPEs 402.

In an example implementation, DPEs 402 do not include cache memories. By omitting cache memories, DPE array 110 is capable of achieving predictable, e.g., deterministic, performance. Further, significant processing overhead is avoided since maintaining coherency among cache memories located in different DPEs 402 is not required. In a further example, cores 404 do not have input interrupts. Thus, cores 404 are capable of operating uninterrupted. Omitting input interrupts to cores 404 also allows DPE array 110 to achieve predictable, e.g., deterministic, performance.

DPE interface block 302 operates as an interface that connects DPEs 402 to other circuitry. In the example of FIG. 4, the other circuitry includes circuit blocks located in a die other than the die including DPE array 110. In the example of FIG. 4, logical interface 304 of DPE interface block 302 includes a plurality of interconnected tiles 408 organized in a row. In particular examples, different architectures may be used to implement tiles 408 within DPE interface block 302 where each different tile architecture supports communication with different resources of IC 100. Tiles 408 are connected so that data may be propagated from one tile to another bi-directionally. Each tile 408 is capable of operating as an interface for the column of DPEs 402 directly above.

Tiles 408 are connected to adjacent tiles, to DPEs 402 immediately above, and to circuitry below, e.g., physical interface 306, using the streaming connections and the memory mapped connections as shown. Tiles 408 may also include a debug network that connects to the debug network implemented in DPE array 110. Tiles 408 are capable of sending data from DPEs 402 to other circuit blocks of IC 100 by way of physical interface 306. Physical interface 306 is capable of communicating with such other circuit blocks of IC 100 by way of inter-die wires 116 as discussed. Examples of other circuit blocks of IC 100 that may be included in die 106 may include, but are not limited to, one or more processors or a processor system, programmable logic, one or more hardwired circuit blocks, and/or a programmable Network-on-Chip (NoC).

Tiles 408 are capable of sending data from other circuit blocks to DPEs 402. Tile 408-1, for example, is capable of providing those portions of the data, whether application or configuration, addressed to DPEs 402 in the column above to such DPEs 402 while sending data addressed to DPEs 402 in other columns on to other tiles 408, e.g., 408-2 or 408-3, so that such tiles 408 may route the data addressed to DPEs 402 in their respective columns accordingly.

It should be appreciated that in one or more other example implementations, one or more or all tiles 408 may also include connections to circuitry and/or circuit blocks located on die 104. For example, one or more of tiles 408 may utilize memory mapped connections and/or streaming connections to couple to circuit blocks located in die 104. In another example, DPE array 110 may include some columns of DPEs 402 that communicate with a tile 408 that couples to circuitry located in the same die as DPE array 110 (e.g., die 104) and other columns of DPEs 402 that communicate with a tile that couples to circuitry located in a different die than the die including DPE array 110 (e.g., to circuitry within die 106).

As discussed, examples of other types of circuitry include, but are not limited to, programmable logic, a processor system, a NoC, a platform management controller, and/or hardwired circuit blocks such as Application Specific Integrated Circuits (ASICs). Programmable logic refers to circuitry that may be programmed to perform specified functions. As an example, programmable logic may be implemented as field programmable gate array type of circuitry. Programmable logic can include an array of programmable circuit blocks. As defined herein, the term "programmable logic" means circuitry used to build reconfigurable digital circuits. Programmable logic is formed of many programmable circuit blocks that provide basic functionality. The topology of programmable logic is highly configurable unlike hardwired circuitry. Each programmable circuit block of programmable logic typically includes a programmable functional element and a programmable interconnect. The programmable interconnects provide the highly configurable topology of the programmable logic. The programmable interconnects may be configured on a per wire basis to provide connectivity among the programmable functional elements of the programmable circuit blocks of the programmable logic and is configurable on a per-bit basis (e.g., where each wire conveys a single bit of information) unlike connectivity among DPEs 402, for example, which are capable of communicating by way of packetized data via the stream switches.

Prior to use, programmable logic must be programmed or "configured" by loading data referred to as a configuration bitstream into internal configuration memory cells therein. The configuration memory cells, once loaded with a configuration bitstream, define how the programmable logic is configured, e.g., the topology, and operates (e.g., particular functions performed). Within this disclosure, a "configuration bitstream" is not equivalent to program code executable by a processor or computer.

A processor system refers to hardwired circuitry that is fabricated as part of a die. The processor system may be implemented as, or include, one or more processors capable of executing program code. The processors may include different varieties of processors (e.g., application processors, real-time processors, etc.). In one example, the processor system is implemented as an individual processor, e.g., a single core capable of executing program code. In another example, the processor system is implemented as a multi-core processor. In still another example, the processor system includes one or more processors whether including one or a plurality of cores, modules, co-processors, I/O interfaces, and/or other resources. The processor system may be implemented using any of a variety of different types of architectures. Example architectures that may be used to implement a processor system may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code (e.g., user applications).

A NoC refers to a programmable interconnecting network for sharing data between endpoint circuits in IC 100. The endpoint circuits can be disposed in DPE array 110 or any of the various types of circuit blocks and/or resources of IC 100 described herein (e.g., programmable logic, processor system, and/or hardwired circuit blocks). A NoC can include high-speed data paths with dedicated switching. In an example, a NoC includes one or more horizontal paths, one or more vertical paths, or both horizontal and vertical path(s).

Within a NoC, the nets that are to be routed through the NoC are unknown until a user circuit design is created for implementation within IC 100. A NoC may be programmed by loading configuration data into internal configuration registers that define how elements within the NoC such as switches and interfaces are configured and operate to pass data from switch to switch and among the NoC interfaces to connect the endpoint circuits. While a NoC is fabricated as part of IC 100 (e.g., is hardwired) and, as such, not physically modifiable, the NoC may be programmed to establish connectivity between different master circuits and different slave circuits of a user circuit design. In some cases, a NoC, upon power-on, does not implement any data paths or routes therein. Once configured, however, the NoC implements data paths or routes between endpoint circuits.

Another example of a circuit block is a Platform Management Controller (PMC). A PMC is a circuit block that may be responsible for managing IC 100. For example, a PMC may be implemented as a subsystem within IC 100 that is capable of managing the other circuit resources across the entirety of IC 100. A PMC is capable of maintaining a safe and secure environment, booting IC 100, and managing IC 100 during normal operations. For example, a PMC is capable of providing unified and programmable control over power-up, boot/configuration, security, power management, safety monitoring, debugging, and/or error handling for the different circuit resources of IC 100 (e.g., DPE array 110, programmable logic, NoC, and/or hardwired circuit blocks). The PMC may operate as a dedicated platform manager that decouples the processor system from the programmable logic. As such, the processor system and the programmable logic may be managed, configured, and/or powered on and/or off independently of one another.

A PMC may be implemented as a processor with dedicated resources. A PMC may include multiple redundant processors. The processors of the PMC are capable of executing firmware. Use of firmware supports configurability and segmentation of global features of IC 100 such as reset, clocking, and protection to provide flexibility in creating separate processing domains (which are distinct from "power domains" that may be die and/or subsystem-specific). Processing domains may involve a mixture or combination of one or more different programmable circuit resources of IC 100 (e.g., wherein the processing domains or partitions may include different combinations of devices from DPE array 110, the processor system, the programmable logic, the NoC, and/or hardwired-circuit blocks).

Hardwired circuit blocks refer to special-purpose circuit blocks fabricated as part of IC 100. Though hardwired, hardwired circuit blocks may be configured by loading configuration data into control registers to implement one or more different modes of operation. Examples of hardwired circuit blocks may include input/output (I/O) blocks, transceivers for sending and receiving signals to circuits and/or systems external to IC 100, memory controllers, or the like. Examples of different I/O blocks may include single-ended and pseudo differential I/Os. Examples of transceivers may include high-speed differentially clocked transceivers. Other examples of hardwired circuit blocks include, but are not limited to, cryptographic engines, digital-to-analog converters (DACs), analog-to-digital converters (ADCs), and the like. In general, hardwired circuit blocks are application-specific circuit blocks.

DPE array 110, as implemented in die 104, may be coupled to any of a variety of other types of circuits beyond those described. For example, die 104 may be coupled to a die that includes or implements RAM, other specialized circuitry (e.g., an ASIC), a modem, a transceiver, or the like.

Figure 5A:
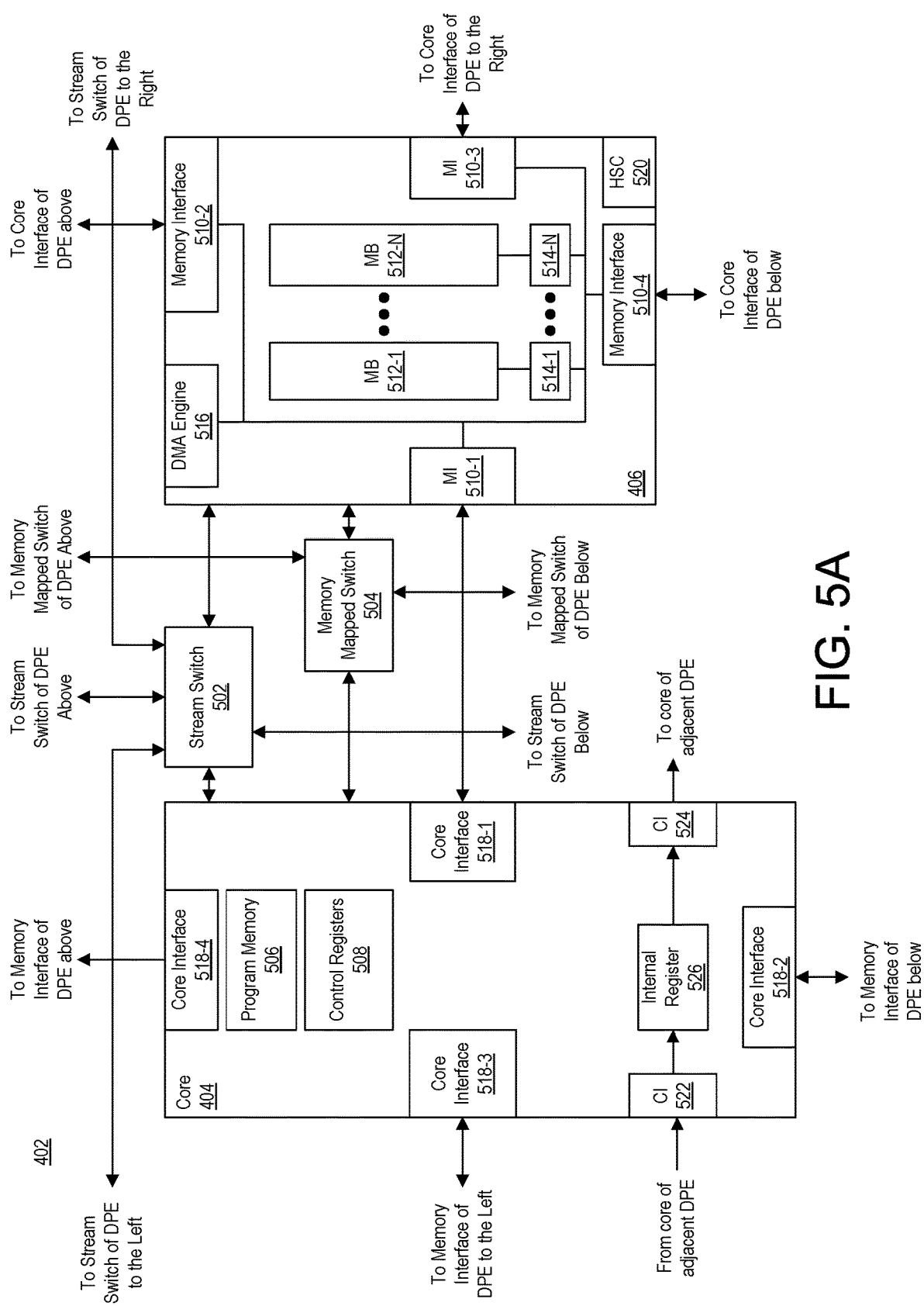
FIGS. 5A and 5B illustrate example architectures of a DPE of a DPE array.
Figure 5B:
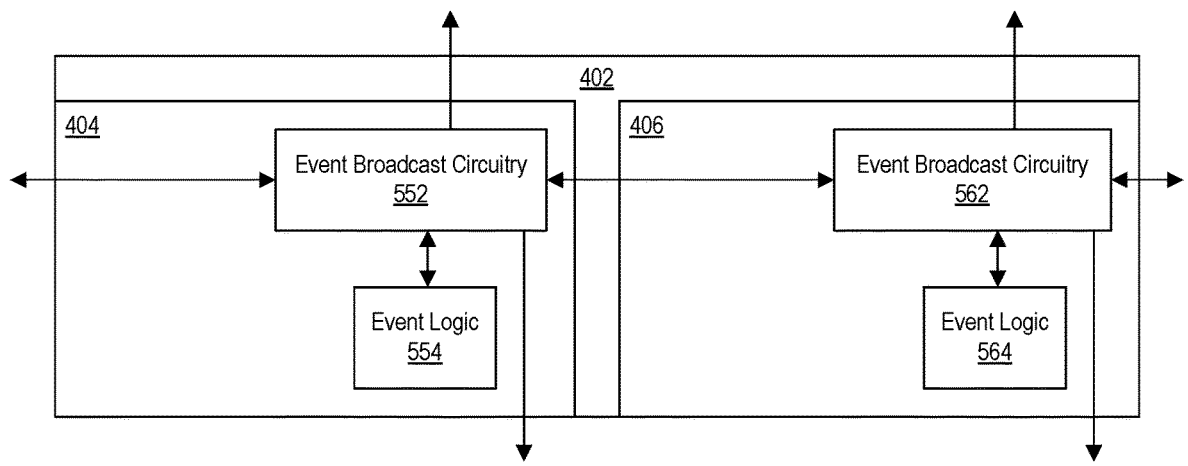

FIGS. 5A and 5B illustrate an example architecture for a DPE 402 of DPE array 110. For purposes of discussion, FIGS. 5A and 5B may be referred to collectively as "FIG. 5."

Referring to FIG. 5A, DPE 402 includes core 404 and memory module 406. DPE 402 further includes DPE interconnects that includes a stream switch 502 and a memory mapped switch 504.

Core 404 provides the data processing capabilities of DPE 402. Core 404 may be implemented as any of a variety of different processing circuits. In the example of FIG. 5, core 404 includes an optional program memory 506. In one or more example implementations, core 404 is implemented as a processor that is capable of executing program code, e.g., computer readable instructions. Program memory 506 is capable of storing instructions that are executed by core 404. Core 404, for example, may be implemented as a CPU, a GPU, a DSP, a vector processor, or other type of processor that is capable of executing instructions. The core may be implemented using any of the various CPU and/or processor architectures described herein. In another example, core 404 is implemented as a very long instruction word (VLIW) vector processor or DSP.

In particular example implementations, program memory 506 is implemented as a dedicated program memory that is private to core 404. Program memory 506 may only be used by the core of the same DPE 402. Thus, program memory 506 may only be accessed by core 404 and is not shared with any other DPE 402 or component of another DPE 402 in DPE array 110. Program memory 506 may include a single port for read and write operations and is addressable using the memory mapped network portion of DPE array 110 via memory mapped switch 504. Via memory mapped switch 504, for example, program memory 506 may be loaded with program code by a master circuit external to DPE array 110. The program code loaded into program memory 506 may be executed by core 404.

In one or more example implementations, core 404 may have a customized architecture to support an application-specific instruction set. For example, core 404 may be customized for wireless applications and be configured to execute wireless-specific instructions. In another example, core 404 may be customized for machine learning and be configured to execute machine learning-specific instructions.

In one or more other example implementations, core 404 is implemented as hardwired circuitry such as a hardened Intellectual Property (IP) core that is dedicated for performing a particular operation or operations. In that case, core 404 may not execute program code. In implementations where core 404 does not execute program code, program memory 506 may be omitted. As an illustrative and non-limiting example, core 404 may be implemented as a hardened forward error correction (FEC) engine or other circuit block.

In some example implementations, different DPEs 402 of DPE array 110 may include different types of cores 404. For example, one or more cores 404 may be implemented to execute program code while cores 404 of other DPEs 402 are incapable of executing program code. In any case, each core 404 is configured to perform computations whether through execution of program code/instructions or not and may include an internal register or registers 526 that may be used with the cascade connectivity described within this disclosure.

Core 404 may include control registers 508. Control registers 508 may be loaded with configuration data to control operation of DPE 402. For example, configuration data loaded into control registers 508 are capable of configuring and/or controlling operation of core 404, memory module 406, stream switch 502, and the cascade interfaces 522, 524 of DPE 402 to be described herein in greater detail. In one or more example implementations, DPE 402 may be activated and/or deactivated, e.g., as a whole, based upon configuration data loaded into control registers 508. Similarly, core 404 may be activated and/or deactivated based upon configuration data loaded into control registers 508. Core 404 may be activated and/or deactivated independently of memory module 406 so that memory module 406 may be accessed by one or more other cores. In the example of FIG. 5A, control registers 508 are addressable (e.g., may be read and/or written) via the memory mapped network through memory mapped switch 504. Deactivation refers to placing the circuit block in a low power mode or disconnecting power (e.g., a supply voltage) from the circuit block.

In one or more example implementations, memory module 406 is capable of storing data that is used by and/or generated by core 404 (or another core of another DPE 402), which is referred to herein as application data. Memory module 406 may include a read/write memory such as a random-access memory. Accordingly, memory module 406 is capable of storing data that may be read and consumed by core 404. Memory module 406 is also capable of storing data (e.g., results) that are written by core 404.

In one or more other example implementations, memory module 406 is capable of storing data, e.g., application data, that may be used by and/or generated by one or more other cores 404 of other DPEs 402 within the DPE array 110. One or more other cores 404 of DPEs 402 may also read from and/or write to memory module 406. In particular example implementations, the other cores 404 that may read from and/or write to memory module 406 may be cores 404 of one or more neighboring DPEs 402. Another DPE that shares a border or boundary with memory module 406 of DPE 402 of FIG. 5A (e.g., an adjacent DPE) is said to be a "neighboring" DPE relative to DPE 402 of FIG. 5A. By allowing core 404 of FIG. 5A and one or more other cores 404 from neighboring DPEs (e.g., DPEs above, below, and to the right of the subject DPE 402 of FIG. 5A) to read and/or write to memory module 406, memory module 406 implements a shared memory that supports communication among the different DPEs 402 and/or cores 404 capable of accessing memory module 406.

In one or more example implementations, the DPE interconnect circuitry for DPE array 110 includes two different networks. The first network is capable of exchanging data with other DPEs 402 of the DPE array 110 and/or other systems of IC 100. For example, the first network is capable of exchanging application data. The second network is capable of exchanging data such as configuration, control, and/or debugging data for the DPE(s) 402.

In the example of FIG. 5, the first network of the DPE interconnect circuitry is formed of stream switch 502 and one or more stream switches of other DPEs 402. As pictured, stream switch 502 is coupled to the stream switches of the DPEs 402 to the left, right, above, and below DPE 402 of FIG. 5A. In the case where DPE 402 of FIG. 5A is in the bottom row, stream switch 502 is coupled to a tile 408 of DPE interface 302.

Stream switch 502 is coupled to core 404 and is capable of communicating with core 404. Core 404, for example, includes a stream interface that connects to stream switch 502 thereby allowing core 404 to communicate directly with other DPEs 402 via the DPE interconnect circuitry. For example, core 404 may include instructions or hardwired circuitry that enable core 404 to send and/or receive application data directly via stream switch 502.

Stream switch 502 is coupled to memory module 406 and is capable of communicating with memory module 406. Memory module 406, for example, includes a stream interface that connects to stream switch 502 thereby allowing other DPEs 402 to communicate with memory module 406 of FIG. 5 via the DPE interconnect circuitry. Stream switch 502 is capable of allowing non-neighboring DPEs and/or DPEs that are not coupled to a memory interface of memory module 406 of FIG. 5A to communicate with core 404 and/or memory module 406 via the DPE interconnect circuitry including the stream switches of the respective DPEs 402 of the DPE array 110. As such, core 404 of FIG. 5 and/or memory module 406 of FIG. 5 are also capable of communicating with any of the DPEs 402 within DPE array 110 via the DPE interconnect circuitry in the DPEs 402.

Stream switch 502 may also be used to communicate with other subsystems such as programmable logic, a NoC, or other circuit blocks. In general, stream switch 502 may be programmed to operate as a circuit-switching stream interconnect or a packet-switched stream interconnect. A circuit-switching stream interconnect is capable of implementing point-to-point, dedicated streams that are suitable for high-bandwidth communication among DPEs 402. A packet-switching stream interconnect allows streams to be shared to time-multiplex multiple logical streams onto one physical stream for medium bandwidth communication.

Stream switch 502 may be configured via control registers 508. The configuration data loaded into control registers 508, for example, dictates which other DPEs 402 and/or systems of IC 100 the DPE 402 of FIG. 5A will communicate with and whether such communications are established as circuit-switched point-to-point connections or as packet-switched connections.

The second network of the DPE interconnect circuitry is formed of memory mapped switch 504 as connected to other memory mapped switches of DPE array 110. Each component of DPE 402 of FIG. 5 that may be read and/or written, e.g., control registers 508, program memory 506, and memory module 406, may be read or written using mapped switch 504. Memory mapped switch 504 may also be used to exchange configuration, control, and debugging data for DPE 402. In the example of FIG. 5, memory mapped switch 504 is capable of receiving configuration data that is used to configure DPE 402. Memory mapped switch 504 may receive configuration data from a memory mapped switch of a DPE 402 located below DPE 402 of FIG. 5 and/or from DPE interface 302 (e.g., when the DPE 402 of FIG. 5 is located in a bottom row of DPE array 110). Memory mapped switch 504 is capable of forwarding received configuration data to one or more other DPEs 402 above DPE 402 of FIG. 5, to core 404 of FIG. 5 (e.g., to program memory 506 and/or to control registers 508), and/or to memory module 406 of FIG. 5 (e.g., to memory within memory module 406). Thus, memory mapped switch 504 of FIG. 5 communicates with a memory mapped switch of a DPE 402 or a tile 408 of DPE interface 302 below and/or with a memory mapped switch of a DPE 402 above.

Taken collectively, the DPE interconnects of the various DPEs 402 of DPE array 110 form the DPE interconnect network (which may include the stream network and/or the memory mapped network). The control registers 508 of the respective DPEs 402 may be programmed by loading configuration data through the respective memory mapped switches 504. Through configuration, the stream switches 502 and/or stream interfaces are programmed to establish connections, whether packet-switched or circuit-switched, with other endpoints, whether in one or more other DPEs 402 and/or in DPE interface 302.

For example, DPE array 110 may be mapped to the address space of a processor (e.g., a processor of the processor system or a PMC). Accordingly, any control registers and/or memories within a DPE 402 of DPE array 110 may be accessed via a memory mapped interface. For example, memory in memory module 406, program memory 506, and/or control registers 508 may be read and/or written via memory mapped switches 504 in the respective DPEs 402.

Memory mapped switch 504 of FIG. 5, in combination with memory mapped switches 504 of other DPEs 402, implement a shared, transaction switched network where transactions propagate from memory mapped switch to memory mapped switch. Each of the memory mapped switches 504, for example, is capable of dynamically routing transactions based upon addresses. Memory mapped switch 504 allows other subsystems of IC 100 to access resources (e.g., components) of DPE 402.

In the example of FIG. 5, memory module 406 includes a plurality of memory interfaces 510-1, 510-2, 510-3, and 510-4. Within FIG. 5, memory interfaces 510-1 and 510-2 are abbreviated as "MI." Memory module 406 further includes a plurality of memory banks 512-1 to 512-N. In particular example implementations, memory module 406 includes eight memory banks. In other example implementations, memory module 406 may include fewer or more memory banks 512. In the example of FIG. 5, each of memory banks 512-1 through 512-N has a respective arbiter 514-1 through 514-N. Each arbiter 514 may include arbitration logic. Further, each arbiter 514 may include a crossbar. Accordingly, any master is capable of writing to any particular one or more of memory banks 512.

Memory module 406 may include a memory mapped interface (not shown) that communicates with memory mapped switch 504. The memory mapped interface in memory module 406 may be connected to the communication lines in memory module 406 that couple to a direct memory access (DMA) engine 516, memory interfaces 510, and arbiters 514 in order to read and/or write to memory bank 512.

DMA engine 516 may include two or more interfaces. For example, one or more interfaces are capable of receiving input data streams from stream switches 502 in other DPEs 402 writing the received data to memory banks 512. One or more other interfaces are capable of reading data from memory banks 512 and sending the data out via a stream interface of DMA engine 516 to other DPEs 402.

Memory module 406 is capable of operating as a shared memory that may be accessed by a plurality of different DPEs 402. In the example of FIG. 5A, memory interface 510-1 is coupled to core 404 via a core interface 518-1 included in core 404. Memory interface 510-1 provides core 404 with access (e.g., read and write capability) to memory banks 512 through arbiters 514. Memory interface 510-2 is coupled to a core interface of the DPE 402 of DPE array 110 above DPE 402 of FIG. 5. Memory interface 510-2 provides the core 404 of the DPE 402 above DPE 402 of FIG. 5 with access to memory banks 512. Memory interface 510-3 is coupled to a core interface of the DPE 402 of DPE array 110 to the right of DPE 402 of FIG. 5. Memory interface 510-3 provides the core 404 of the DPE 402 to the right of DPE 402 of FIG. 5 with access to memory banks 512. Memory interface 510-4 is coupled to a core interface of the DPE 402 of DPE array 110 below DPE 402 of FIG. 5. Memory interface 510-4 provides the core 404 of the DPE 402 below DPE 402 of FIG. 5 with access to memory banks 512.

Core 404 is capable of accessing memory modules of other neighboring DPEs via core interfaces 518-2, 518-3, and 518-4. In the example of FIG. 5, core interface 518-2 is coupled to a memory interface of the DPE 402 below DPE 402 of FIG. 5. Accordingly, core 404 is capable of accessing the memory module 406 of the DPE 402 below DPE 402 of FIG. 5. Core interface 518-3 is coupled to a memory interface of the DPE 402 to the left of DPE 402 of FIG. 5. Accordingly, core 404 is capable of accessing the memory module 406 of the DPE 402 to the left of DPE 402 of FIG. 5. Core interface 518-4 is coupled to a memory interface of the DPE 402 above DPE 402 of FIG. 5. Accordingly, core 404 is capable of accessing the memory module 406 of the DPE 402 above DPE 402 of FIG. 5.

As noted, core 404 is capable of mapping read and/or write operations in the correct direction through core interfaces 518-1, 518-2, 518-3, and/or 518-4 based upon the addresses of such operations. When core 404 generates an address for a memory access, core 404 is capable of decoding the address to determine the direction (e.g., the particular DPE 402 to be accessed) and forwards the memory operation to the correct core interface in the determined direction.

Memory module 406 may include hardware synchronization circuitry (HSC) 520. In general, HSC 520 is capable of synchronizing operation of different cores 404 (e.g., cores 404 of neighboring DPEs 402), core 404 of FIG. 5, DMA engine 516, and other external masters (e.g., a processor) that may communicate with a DPE such as DPE 402 of FIG. 5A via the DPE interconnect circuitry. As an illustrative and non-limiting example, HSC 520 is capable of synchronizing two different cores 404 in different DPEs 402 accessing the same, e.g., a shared, buffer in memory module 406 of FIG. 5A. HSC 520 may be accessed by core 404 and/or cores of neighboring DPEs (e.g., those cores 404 of other DPEs 402 connected to memory interfaces 510) and/or by the memory mapped switches 504 of other DPEs 402.

In addition to communicating with neighboring DPEs 402 through shared memory modules 406 and neighboring and/or non-neighboring DPEs 402 via the DPE interconnect circuitry, core 404 may include one or more cascade interfaces 522, 524 such as a cascade input (depicted as "CI" 522) and a cascade output (depicted as "CI" 524). Cascade interfaces 522 and 524 are capable of providing direct communication with other cores 404 of adjacent DPEs 402. As pictured, cascade interface 522 of core 405 is capable of receiving an input data stream directly from the core 404 of an adjacent DPE 402 (e.g., the DPE 402 to the left, above, or below). The data stream received via cascade interface 522 may be provided to the data processing circuitry within core 404. Cascade interface 524 of core 404 is capable of sending an output data stream directly to the core 404 of an adjacent DPE 402 (e.g., the DPE 402 to the right, above, or below).

In the example of FIG. 5, each of cascade interface 522 and cascade interface 524 may include a first-in-first-out (FIFO) interface for buffering (not shown). In an example implementation, cascade interfaces 522 and 524 are capable of conveying data streams that may be hundreds of bits in width. The particular bit width of cascade interfaces 522 and 524 is not intended as a limitation. In the example of FIG. 5, cascade interface 522 is coupled to an internal register (or registers) 526 within core 404. Internal register 526 may store data that is generated and/or being operated on by data processing circuitry within core 404.

In one aspect, internal register 526 may be an accumulation register. An accumulation register of core 404 is an internal register in which intermediate results of operations performed by core 404 may be stored. The accumulation register allows core 404 to store such intermediate results of calculations without having to write such content/data to another memory located external to core 404. In another aspect, internal register 526 is another register that may be connected to the accumulation register. For example, internal register 526 may be a register that is coupled to the accumulation register and specifically accessible to receive data via cascade interface 522 and write the data to the accumulation register and/or output data from the accumulation register over cascade interface 524. Cascade interface 524 is capable of outputting the contents of internal register 526 and may do so each clock cycle.

In the example of FIG. 5, cascade interfaces 522 and 524 may be programmed based upon configuration data loaded into control registers 508. For example, based upon control registers 508, cascade interface 522 may be activated or deactivated. Similarly, based upon control registers 508, cascade interface 524 may be activated or deactivated. Cascade interface 522 may be activated and/or deactivated independently of cascade interface 524.

In an example implementation, cascade interfaces 522 and 524 are controlled by core 404. For example, core 404 may include instructions to read/write to cascade interfaces 522 and/or 524. In another example, core 404 may include hardwired circuitry that is capable of reading and/or writing to cascade interfaces 522 and/or 524. In particular example implementations, cascade interfaces 522 and 524 may be controlled by an entity outside of core 404.

In one or more example implementations, the DPE array 110 may be functionally isolated into a plurality groups, e.g., clusters, of one or more DPEs 402. For example, specific core interfaces 518 and/or memory interfaces 510 may be enabled and/or disabled via configuration data to create one or more clusters of DPEs 402, where each cluster includes one or more (e.g., a subset) of DPEs 402 of the DPE array 110, memory modules 406 of selected DPEs 402, cores 404 of selected DPEs 402, or different combinations thereof. In addition or in the alternative, the stream interfaces may be configured independently per cluster so as to communicate with (e.g., only with) other cores 404 and/or memory modules 406 of DPEs 402 in the same cluster and/or with a designated input source and/or output destination. In addition or in the alternative, the cascade interfaces 522, 524 may be configured so that only cores 404 in the same cluster are capable of communicating via the cascade interfaces 522, 524. This effectively isolates clusters of DPEs 402 so that different clusters are capable of executing different applications independently and in isolation.

It should be appreciated that DPEs 402 may be organized into clusters whereby certain DPE(s) 402 or all DPE(s) 402 of one cluster may be connected to other DPEs 402 in the same cluster through any combination of one or more or all of stream switches 502, shared memory (e.g., core interfaces 518 and/or memory interfaces 510), and/or cascade interfaces 522, 524. In addition, certain DPE(s) 402 of one cluster may be isolated from DPE(s) 402 of another cluster in terms of not being able to communicate cross cluster using one or more of the stream switches 502, shared memory, and/or cascade interfaces 522, 524, but permitted to communicate cross cluster using a subset of the stream switches 502, shared memory, and/or cascade interfaces 522, 524.

As discussed, in one or more example implementations, DPE array 110 may be formed of homogeneous DPEs 402. In one or more other example implementations, DPE array 110 may be formed of different types of DPEs 402. For example, the DPEs 402 may include different types of cores 404 such as cores 404 that execute program code, hardwired cores that do not execute program code, special purpose cores, or any combination thereof. In still another example implementation, the DPE array 110 may include one or more DPEs that are dummy DPEs, e.g., not functional DPEs. Each different DPE array, whether implemented in the same die or in different dies may include a different number of DPEs and/or different types of DPEs.

FIG. 5B illustrates an example of event processing circuitry within a DPE 402. DPEs may include event processing circuitry that is interconnected to event processing circuitry of other DPEs. In the example of FIG. 5B, event processing circuitry is implemented in core 404 and within memory module 406. Core 404 may include event broadcast circuitry 552 and event logic 554. Memory module 406 may include separate event processing circuitry including event broadcast circuitry 562 and event logic 564.

Event broadcast circuitry 552 may be connected to the event broadcast circuitry within each of the cores of the neighboring DPEs above and below DPE 402 of FIG. 5. Event broadcast circuitry 552 may also be connected to the event broadcast circuitry within the memory module of the neighboring DPE to the left of DPE 402 of FIG. 5. As pictured, event broadcast circuitry 552 is connected to event broadcast circuitry 562. Event broadcast circuitry 562 may be connected to the event broadcast circuitry within each of the memory modules of the neighboring DPEs above and below the DPE 402 illustrated in FIG. 5. Event broadcast circuitry 562 may also be connected to the event broadcast circuitry within the core of the neighboring DPE to the right of DPE 402 of FIG. 5.

In this manner, the event processing circuitry of the DPEs may form an independent event broadcast network within DPE array 110. The event broadcast network within DPE array 110 may exist independently of the other networks described herein. Further, the event broadcast network may be individually configurable by loading suitable configuration data into control registers 508.

In the example of FIG. 5, control registers 508 program event logic 554 and 564 to detect particular types of events that occur within core 404 and memory module 406, respectively. The data loaded into control registers 508, for example, determines which of a plurality of different types of predetermined events are detected by event logic 552 and 562. Examples of events that may be detected by event broadcast circuitry 552 are events that occur within core 404. These events may include, but are not limited to, starts and/or ends of read operations by core 404, starts and/or ends of write operations by core 404, stalls, and the occurrence of other operations performed by core 404. Examples of events that may be detected by event broadcast circuitry 562 are events that occur within memory module 406. These events may include, but are not limited to, starts and/or ends of read operations by DMA engine 516, starts and/or ends of write operations by DMA engine 516, stalls, and the occurrence of other operations performed by memory module 406. The data loaded into control registers 508, for example, determines which of a plurality of different types of predetermined events are detected by event logic 554 and/or 564. It should be appreciated that event logic 554 and/or event logic 564 are capable of detecting events originating from and/or relating to DMA engine 516, memory mapped switch 504, stream switch 502, memory interfaces 510, core interfaces 518, cascade interfaces 522, 524, and/or other components located in the DPEs.

For example, configuration data loaded into control registers 508 may determine which of the events received by event broadcast circuitry 552 and/or 562 from other event broadcast circuitries are propagated to yet other event broadcast circuitries or other circuitry. The configuration data may also specify which events generated internally by event logic 554 and/or 564 are propagated to other event broadcast circuitries and/or to other circuitry.

Accordingly, events generated by event logic 554 and 564 may be provided to event broadcast circuitry 552 and 562, respectively, and broadcast to other DPEs. In the example of FIG. 5B, event broadcast circuitry 552 and/or 562 is capable of broadcasting events, whether internally generated or received from other DPEs, to the DPE above, to the DPE to the left, and to the DPE or to logical interface 304 below. Event broadcast circuitry 552 is also capable of broadcasting events to event broadcast circuitry 562 within memory module 406.

In the example of FIG. 5A, event broadcast circuitries located in cores communicate vertically with event broadcast circuitries located in cores of neighboring DPEs above and/or below. In the case where a DPE is immediately above (or adjacent) logical interface 304, the event broadcast circuitry in the core of that DPE is capable of communicating with logical interface 304. Similarly, event broadcast circuitry located in memory modules communicate vertically with event broadcast circuitry located in memory modules of neighboring DPEs above and/or below. In the case where a DPE is immediately above (e.g., adjacent) logical interface 304, the event broadcast circuitry in the memory module of that DPE is capable of communicating with logical interface 304. Event broadcast circuitry is further capable of communicating with the event broadcast circuitry immediately to the left and/or to the right regardless of whether such event broadcast circuitry is located in another DPE and/or within a core or a memory module.

Once control registers 508 are written, event logic 554 and event logic 564 are capable of operating in the background. In one or more example implementations, event logic 554 generates events only in response to detecting particular conditions within core 404; and, event logic 562 generates events only in response to detecting particular conditions within memory module 406.

Figure 6A:
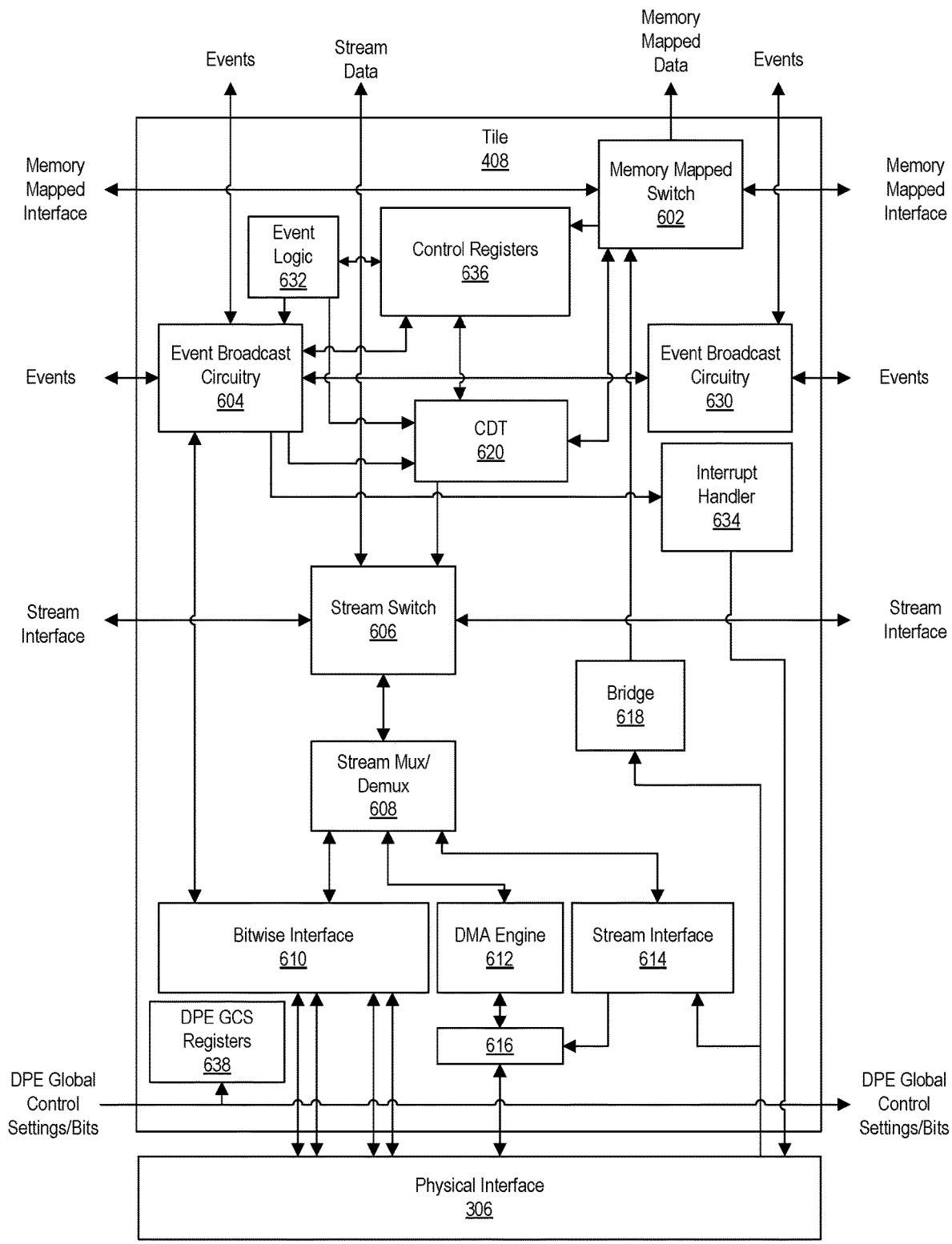
FIGS. 6A, 6B, and 6C illustrate example architectures for tiles of a logical interface of a DPE interface.
Figure 6B:
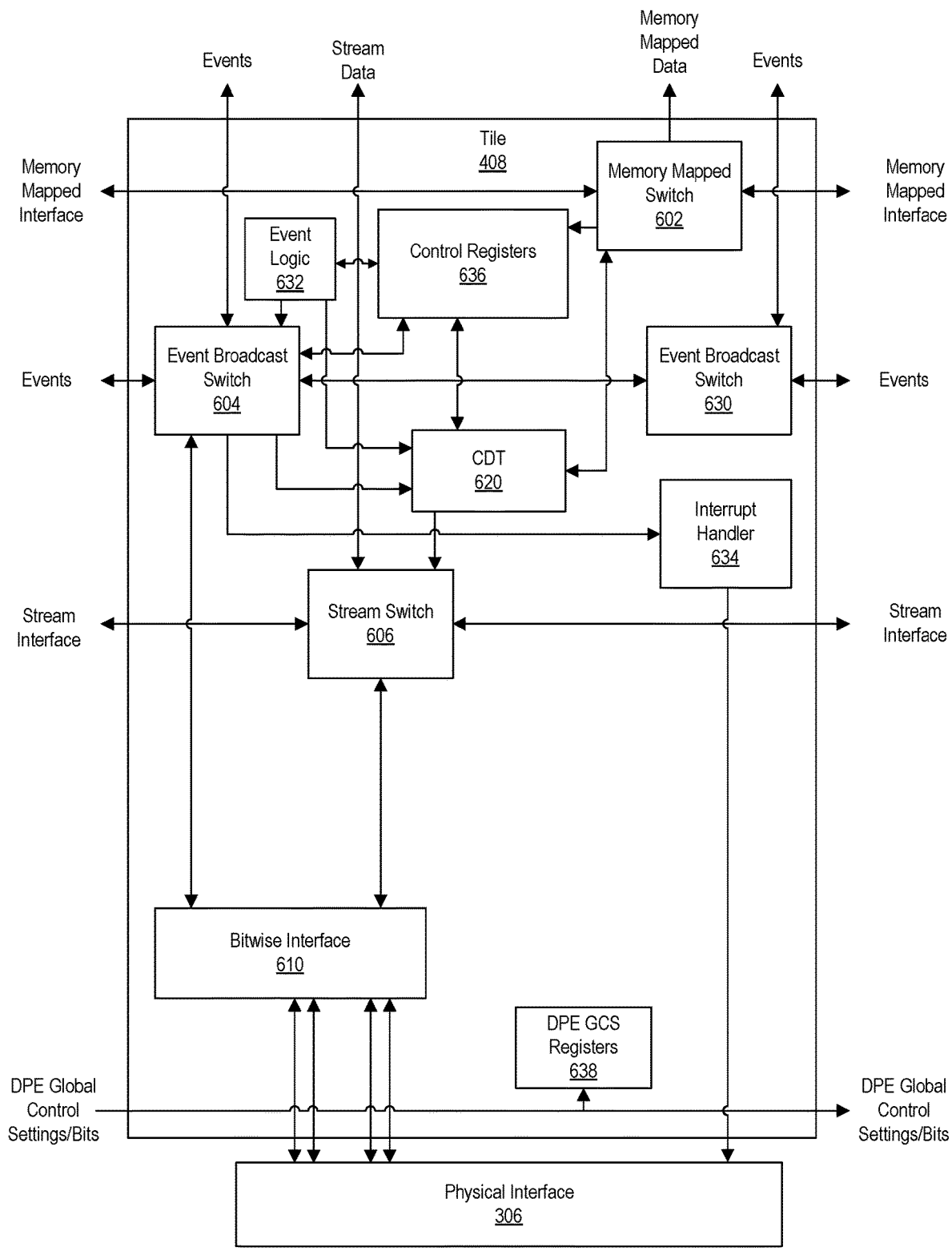
Figure 6C:
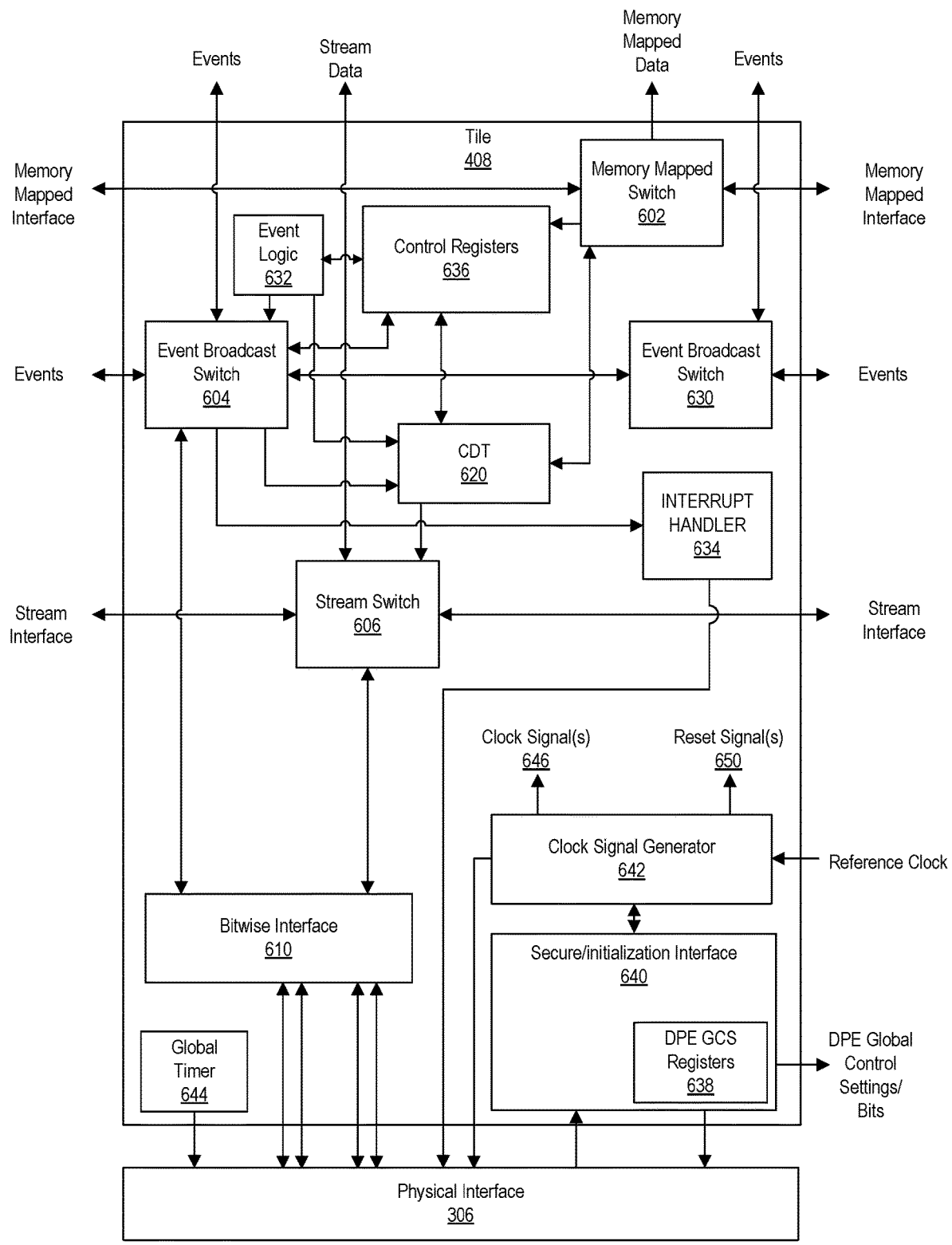

FIGS. 6A, 6B, and 6C illustrate example architectures for implementing tiles of logical interface 304. FIG. 6A illustrates an example implementation of tile 408. The architecture illustrated in FIG. 6A may also be used to implement any of the other tiles included in logical interface 304.

Tile 408 includes a memory mapped switch 602. Memory mapped switch 602 may include a plurality of memory mapped interfaces for communicating in each of a plurality of different directions. As an illustrative and non-limiting example, memory mapped switch 602 may include one or more memory mapped interfaces where a memory mapped interface has a master that connects vertically to the memory mapped interface of the DPE 402 immediately above. As such, memory mapped switch 602 is capable of operating as a master to the memory mapped interfaces of one or more of DPEs 402. In a particular example, memory mapped switch 602 may operate as a master for a subset of DPEs 402. For example, memory mapped switch 602 may operate as a master for a column of DPEs 402 above tile 408. It should be appreciated that memory mapped switch 602 may include additional memory mapped interfaces to connect to a plurality of different circuits (e.g., DPEs) within DPE array 110. The memory mapped interfaces of memory mapped switch 602 may also include one or more slaves capable of communicating with circuitry (e.g., one or more DPE(s)) located above tile 408.

In the example of FIG. 6A, memory mapped switch 602 may include one or more memory mapped interfaces that facilitate communication in the horizontal direction to memory mapped switches in neighboring tiles of logical interface 304. For purposes of illustration, memory mapped switch 602 may be connected to neighboring tiles in the horizontal direction via memory mapped interfaces, where each such memory mapped interface includes one or more masters and/or one or more slaves. Accordingly, memory mapped switch 602 is capable of moving data (e.g., configuration, control, and/or debug data) from one tile to another to reach a correct DPE 402 and/or subset of a plurality of DPEs 402 and direct the data to the target DPEs, whether such DPEs are in the column above tile 408 or in another subset for which another tile of logical interface 304 operates as an interface. If memory mapped transactions are received from physical interface 306, for example, memory mapped switch 602 is capable of distributing the transaction(s) horizontally, e.g., to other tiles within logical interface 304.

Memory mapped switch 602 may also include a memory mapped interface having one or more masters and/or slaves coupled to control registers 636 within tile 408. Through memory mapped switch 602, configuration data may be loaded into control registers 636 to control various functions and operations performed by components within tile 408. FIGS. 6A, 6B, and 6C illustrate connections between control registers 636 and one or more elements of tile 408. It should be appreciated, however, that control registers 636 may control other elements of tile 408 and, as such, have connections to such other elements though such connections are not illustrated in FIGS. 6A, 6B, and/or 6C.

Memory mapped switch 602 may include a memory mapped interface coupled to physical interface 306 via bridge 618. The memory mapped interface may include one or more masters and/or slaves. Bridge 618 is capable of converting memory mapped data transfers from physical interface 306 (e.g., configuration, control, and/or debug data) into memory mapped data that may be received by memory mapped switch 602.

Tile 408 may also include event processing circuitry. For example, tile 408 includes event logic 632. Event logic 632 may be configured by control registers 636. In the example of FIG. 6A, event logic 632 is coupled to Control, debug, and trace (CDT) circuit 620. The configuration data loaded into control registers 636 defines the particular events that may be detected locally within tile 408. Event logic 632 is capable of detecting a variety of different events, per control registers 636, originating from and/or relating to, DMA engine 612, memory mapped switch 602, stream switch 606, first-in-first-out (FIFO) memories located within bitwise interface 610, and/or stream interface 614. Examples of events may include, but are not limited to, DMA finished transfer, a lock being released, a lock being acquired, the end of a bitwise transfer, or other events relating to the start or end of data flow through tile 408. Event logic 632 may provide such events to event broadcast circuitry 604 and/or to CDT circuit 620. In another example implementation, event logic 632 may not have a direct connection to CDT circuit 620, but rather connect to CDT circuit 620 via event broadcast circuitry 604.

Tile 408 includes event broadcast circuitry 604 and event broadcast circuitry 630. Each of event broadcast circuitry 604 and event broadcast circuitry 630 provide an interface between the event broadcast network of DPE array 110 and other tiles of logical interface 304. Event broadcast circuitry 604 is coupled to event broadcast circuitry in an adjacent or neighboring tile of logical interface 304 and to event broadcast circuitry 630. Event broadcast circuitry 630 is coupled to event broadcast circuitry in adjacent or neighboring tile of logical interface 304. In one or more other example implementations, where tiles of logical interface 304 are arranged in a grid or array, event broadcast circuitry 604 and/or event broadcast circuitry 630 may be connected to event broadcast circuitry located in other tiles above and/or below tile 408.

In the example of FIG. 6A, event broadcast circuitry 604 is coupled to the event broadcast circuitry in the core of the DPE 402 immediately adjacent to (e.g., above) tile 408. Event broadcast circuitry 604 is also coupled to bitwise interface 610. Event broadcast circuitry 630 is coupled to the event broadcast circuitry in the memory module of the DPE 402 immediately adjacent (e.g., above) tile 408. Though not illustrated, in another example implementation, event broadcast circuitry 630 may also be coupled to bitwise interface 610.

Event broadcast circuitry 604 and event broadcast circuitry 630 are capable of sending events generated internally by event logic 632, events received from other tiles 408 of logical interface 304, and/or events received from DPEs 402 on to other tiles. Event broadcast circuitry 604 is further capable of sending such events to other dies via bitwise interface 610. In another example, events may be sent from event broadcast circuitry 604 to other blocks and/or systems in IC 100 such as an ASIC and/or PL circuit blocks located outside of DPE array 110 using bitwise interface 610 (not shown). Further, bitwise interface 610 may receive events from other dies and provide such events to event broadcast switch 604 and/or stream switch 606. In an aspect, event broadcast circuitry 604 is capable of sending any events received from other dies of IC 100 via bitwise interface 610 to other tiles 408 of logical interface 304 and/or to DPEs 402 of DPE array 110. Because events may be broadcast among the tiles 408 in logical interface 304, events may reach any DPE 402 in DPE array 110 by traversing through tiles 408 in logical interface 304 and the event broadcast circuitry to the target (e.g., intended) DPEs 402. For example, the event broadcast circuitry in tile 408 of logical interface 304 beneath the column (or subset) of DPEs 402 managed by tile 408 including one or more target DPE(s) may propagate the events to the target DPEs.

In the example of FIG. 6A, event broadcast circuitry 604 and event logic 632 are coupled to CDT circuit 620. Event broadcast circuitry 604 and event logic 632 are capable of sending events to CDT circuit 620. CDT circuit 620 is capable of packetizing the received events and sending the events from event broadcast circuitry 604 and/or event logic 632 to stream switch 606. In particular example implementations, event broadcast circuitry 630 may be connected to stream switch 606 and/or to CDT circuit 620 as well.

In one or more example implementations, event broadcast circuitry 604 and event broadcast circuitry 630 are capable of gathering broadcast events from one or more or all directions as illustrated in FIG. 6A (e.g., via any of the connections shown in FIG. 6A). In some cases, event broadcast circuitry 604 and/or event broadcast circuitry 630 are capable of performing a logical "OR" of the signals and forwarding the results in one or more or all directions (e.g., including to CDT circuit 620). Each output from event broadcast circuitry 604 and event broadcast circuitry 630 may include a bitmask that is configurable by configuration data loaded into control registers 636. The bitmask determines which events are broadcast in each direction on an individual basis. Such bitmasks, for example, may eliminate unwanted or duplicative propagation of events.

Interrupt handler 634 is coupled to event broadcast circuitry 604 and is capable of receiving events that are broadcast from event broadcast circuitry 604. In one or more example implementations, interrupt handler 634 may be configured by configuration data loaded into control registers 636 to generate interrupts to physical interface 306 in response to selected events and/or combinations of events from event broadcast circuitry 604 (e.g., DPE generated events and/or events generated within tile 408). Interrupt handler 634 is capable of generating interrupts, based upon the configuration data, to circuits located in other dies of IC 100. For example, interrupt handler 634 is capable of informing other device-level management blocks such as a processor or a processor system of events occurring in DPE array 110 and/or of events occurring in tiles 408 of logical interface 304 based upon the interrupt(s) that are generated by interrupt handler 634.

Bitwise interface 610 couples to physical interface 306. In one or more example implementations, bitwise interface 610 provides an asynchronous clock-domain crossing between DPE array 110 and another clock domain. Bitwise interface 610 may also provide level shifters and/or isolation cells for integration with power rails. In particular example implementations, bitwise interface 610 may be configured to provide 32-bit, 64-bit, and/or a 128-bit interface with FIFO support to handle back-pressure. The particular width of bitwise interface 610 may be controlled by configuration data loaded into control registers 636.

In one or more other example implementations, bitwise interface 610 is coupled to other types of circuit blocks and/or systems in other dies via physical interface 306. For example, bitwise interface 610 may be coupled to an ASIC, analog/mixed signal circuitry, and/or other system. As such, bitwise interface 610 is capable of transferring data between tile 408 and such other systems and/or circuit blocks.

In the example of FIG. 6A, tile 408 includes a stream switch 606. Stream switch 606 is coupled to a stream switch in adjacent or neighboring tile 408 and to a stream switch in adjacent or neighboring tile 408 through one or more stream interfaces. Each stream interface may include one or more masters and/or one or more slaves. In particular example implementations, each pair of neighboring stream switches is capable of exchanging data via one or more streams in each direction. Stream switch 606 is also coupled to the stream switch in the DPE immediately above tile 408 by one or more stream interfaces. Stream switch 606 is also coupled to bitwise interface 610, DMA engine 612, and/or to stream interface 614 via stream multiplexer/demultiplexer 608 (abbreviated as stream mux/demux in FIG. 6A). Steam switch 606, for example, may include one or more stream interfaces used to communicate with each of bitwise interface 610, DMA engine 612, and/or stream interface 614 through stream multiplexer/demultiplexer 608.

Stream switch 606 may be configurable by configuration data loaded into control registers 636. Stream switch 606, for example, may be configured to support packet-switched and/or circuit-switched operation based upon the configuration data. Further, the configuration data defines the particular DPE(s) 402 to which stream switch 606 communicates. In one or more example implementations, the configuration data defines the particular DPE 402 and/or subset of DPEs 402 in the column of DPEs 402 directly above tile 408 to which stream switch 606 communicates.

Stream multiplexer/demultiplexer 608 is capable of directing data received from bitwise interface 610, DMA engine 612, and/or stream interface 614 to stream switch 606. Similarly, stream multiplexer/demultiplexer 608 is capable of directing data received from stream switch 606 to bitwise interface 610, DMA engine 612, and/or to stream interface 614. For example, stream multiplexer/demultiplexer 608 may be programmed by configuration data stored in control registers 636 to route selected data to bitwise interface 610, to route selected data to DMA engine 612 where such data are sent to physical interface 306 as memory mapped transactions, and/or to route selected data to stream interface 614 where the data are sent over physical interface 306 as a data stream or streams.

DMA engine 612 is capable of operating as a master to direct data into physical interface 306 through selector block 616. DMA engine 612 is capable of receiving data from DPEs 402 and providing such data to physical interface 306 as memory mapped data transactions. In one or more example implementations, DMA engine 612 includes hardware synchronization circuitry that may be used to synchronize multiple channels included in DMA engine 612 and/or a channel within DMA engine 612 with a master that polls and drives the lock requests. For example, the master may be a processor and/or processor system in another die of IC 100. The master may also receive an interrupt generated by the hardware synchronization circuitry within DMA engine 612.

In one or more example implementations, DMA engine 612 is capable of accessing an external memory (e.g., a memory external to IC 100) and/or a memory implemented in another die (e.g., a die including only RAM) of IC 100. For example, DMA engine 612 is capable of receiving data streams from DPEs 402 and sending the data stream to the memory through physical interface 306. Similarly, DMA engine 612 is capable of receiving data from external memory where the data may be distributed to other tile(s) 408 of logical interface 304 and/or up into target DPEs 402.

In one or more example implementations, DMA engine 612 includes security bits that may be set using DPE global control settings registers (DPE GCS registers) 638. The memory may be divided into different regions or partitions where DPE array 110 is only permitted to access particular regions of the memory. The security bits within DMA engine 612 may be set so that DPE array 110, by way of DMA engine 612, is only able to access the particular region(s) of memory that are allowed per the security bits. For example, an application implemented by DPE array 110 may be restricted to access only particular regions of memory, restricted to only reading from particular regions of memory, and/or restricted from writing to the memory entirely using this mechanism.

The security bits within DMA engine 612 that control access to the memory may be implemented to control DPE array 110 as a whole or may be implemented in a more granular way where access to the memory may be specified and/or controlled on a per DPE basis, e.g., core by core, or for groups of cores that are configured to operate in a coordinated manner, e.g., to implement a kernel and/or other application.

Stream interface 614 is capable of receiving data from physical interface 306 and forwarding the data to stream to multiplexer/demultiplexer 608. Stream interface 614 is further capable of receiving data from stream multiplexer/demultiplexer 608 and forwarding the data to physical interface 306. Selector block 616 is configurable to pass data from DMA engine 612 or from stream interface 614 on to physical interface 306.

CDT circuit 620 is capable of performing control, debug, and trace operations within tile 408. Regarding debug, each of the registers located in tile 408 is mapped onto the memory map accessible via memory mapped switch 602. CDT circuit 620 may include circuitry such as, for example, trace hardware, trace buffers, performance counters, and/or stall logic. Trace hardware of CDT circuit 620 is capable of collecting trace data. Trace buffers of CDT circuit 620 are capable of buffering trace data. CDT circuit 620 is further capable of outputting the trace data to stream switch 606.

In one or more example implementations, CDT circuit 620 is capable of collecting data, e.g., trace and/or debug data, packetizing such data, and then outputting the packetized data through stream switch 606. For example, CDT circuit 620 is capable of outputting packetized data and providing such data to stream switch 606. Additionally, control registers 636 or others can be read or written during debugging via memory mapped transactions through the memory mapped switch 602 of the respective tile. Similarly, performance counters within CDT circuit 620 can be read or written during profiling via memory mapped transactions through the memory mapped switch 602 of the respective tile.

In one or more example implementations, CDT circuit 620 is capable of receiving any events propagated by event broadcast circuitry 604 (or event broadcast circuitry 630) or selected events per the bitmask utilized by the interface of event broadcast circuitry 604 that is coupled to CDT circuit 620. CDT circuit 620 is further capable of receiving events generated by event logic 632. For example, CDT circuit 620 is capable of receiving broadcast events from DPEs 402, tile 408 (e.g., event logic 632 and/or event broadcast switch 604), and/or or other tiles of logical interface 304. CDT circuit 620 is capable of packing, e.g., packetizing, a plurality of such events together in a packet and associating the packetized events with timestamp(s). CDT circuit 620 is further capable of sending the packetized events over stream switch 606 to destinations external to tile 408. Events may be sent by way of stream switch 606 and stream multiplexer/demultiplexer 608 to physical interface 306 via bitwise interface 610, DMA engine 612, and/or stream interface 614.

DPE GCS registers 638 may store DPE global control settings/bits (also referred to herein as "security bits") that are used to enable or disable secure access to and/or from DPE array 110. DPE GCS registers 638 may be programmed via a SoC secure/initialization interface to be described in greater detail below in connection with FIG. 6C. The security bit(s) received from the SoC secure/initialization interface may propagate from one tile to the next of logical interface 304 via a bus as illustrated in FIG. 6A.

In one or more example implementations, external memory mapped data transfers into DPE array 110 may not be secure or trusted. Without setting the security bits within DPE GCS registers 638, any entity in IC 100 that is capable of communicating by way of memory mapped data transfers is capable of communicating with DPE array 110. By setting the security bits within DPE GCS registers 638, the particular entities that are permitted to communicate with DPE array 110 may be defined such that only the specified entities capable of generating secure traffic may communicate with DPE array 110.

In one or more example implementations, memory mapped data transfers may include additional sideband signals, e.g., bits, that specify whether a transaction is secure or not secure. When the security bits within DPE GCS registers 638 are set, then memory mapped transactions entering into logical interface 304, e.g., tile 408, must have the sideband signals set to indicate that the memory mapped transaction arriving at logical interface 304 is secure. When a memory mapped transaction arriving at logical interface 304 does not have the sideband bits set and the security bits are set within DPE GCS registers 638, then logical interface 304 does not allow the transaction to enter or pass to DPEs 402.

In one or more example implementations, IC 100 includes a secure agent (e.g., circuit) that operates as a root of trust. The PMC, for example, may be the secure agent. The secure agent is capable of configuring the different entities (e.g., circuits) within IC 100 with the permissions needed to set the sideband bits within memory mapped transactions in order to access DPE array 110 when the security bits of DPE GCS registers 638 are set. The secure agent, at the time IC 100 is configured, gives permissions to the different masters that may be implemented therein thereby giving such masters the capability of issuing secure transactions to DPE array 110.

FIG. 6B illustrates another example implementation of tile 408. The example architecture illustrated in FIG. 6B may also be used to implement any of the other tiles included in logical interface 304. The example of FIG. 6B illustrates a simplified version of the architecture illustrated in FIG. 6A. The tile architecture of FIG. 6B provides connectivity among DPEs 402 and other systems and/or dies within IC 100. For example, tile 408 of FIG. 6B may provide an interface between DPEs 402 and analog/mixed signal circuit blocks, ASICs, or other systems as described herein. In the example of FIG. 6B, DMA engine 612, stream interface 614, selector block 616, bridge 618, and stream multiplexer/demultiplexer 608 are omitted. As such, tile 408 of FIG. 6B may be implemented using less area of IC 100. Further, as pictured, stream switch 606 is directly coupled to bitwise interface 610.

The example architecture of FIG. 6B is unable to receive memory mapped data, e.g., configuration data, for purposes of configuring DPEs 402. Such configuration data may be received from neighboring tiles via memory mapped switch 602 and directed to the subset of DPEs that tile 408 manages (e.g., up into the column of DPEs 402 above tile 408 of FIG. 6B).

FIG. 6C illustrates another example implementation of tile 408. In particular example implementations, the architecture illustrated in FIG. 6C may be used to implement only one tile within logical interface 304. The architecture illustrated in FIG. 6C is similar to the architecture shown in FIG. 6B. In FIG. 6C, additional components such as a secure/initialization interface 640, a clock signal generator 642, and a global timer 644 are included.

In the example of FIG. 6C, secure/initialization interface 640 is capable of providing access to global reset registers for DPE array 110 (not shown) and to DPE GCS registers 638. DPE GCS registers 638 can include the control registers for clock signal generator 642. As pictured, secure/initialization interface 640 is capable of providing security bits to DPE GCS registers 638 and propagating the security bits to other DPE GCS registers 638 in other tiles of logical interface 304. Secure/initialization interface 640 is capable of implementing a single slave endpoint for logical interface 304.

In the example of FIG. 6C, clock signal generator 642 is capable of generating one or more clock signal(s) 646 and/or one or more reset signal 650. Clock signal(s) 646 and/or reset signals 650 may be distributed to each of DPEs 402 and/or to other tiles of logical interface 304 of DPE array 110. For example, clock signal generator 642 may include one or more phase lock loop circuits (PLLs). As illustrated, clock signal generator 642 is capable of receiving a reference clock signal generated by another circuit external to DPE array 110 that may be located on the same die as DPE array 110. In another example, the reference clock may be received from physical interface 306. Clock signal generator 642 is capable of generating the clock signal(s) 646 based upon the received reference clock signal.

In the example of FIG. 6C, clock signal generator 642 is configured through secure/initialization interface 640. For example, clock signal generator 642 may be configured by loading data into DPE GCS registers 638. As such, the clock frequency or clock frequencies of DPE array 110 and the generation of reset signals 650 may be set by writing appropriate configuration data to DPE GCS registers 638 through secure/initialization interface 640. For test purposes, clock signal(s) 646 and/or reset signals 650 may also be routed directly physical interface 306.

Secure/initialization interface 640 may be coupled to a control/debug (circuit) block (e.g., a control and/or debug system of IC 100 not shown). In one or more example implementations, secure/initialization interface 640 is capable of providing status signals to the control/debug block. As an illustrative and non-limiting example, secure/initialization interface 640 is capable of providing a "PLL lock" signal generated from inside of clock signal generator 642 to the control/debug block. The PLL lock signal may indicate when the PLL acquires lock on the reference clock signal.

Secure/initialization interface 640 is capable of receiving instructions and/or data via physical interface 306. The data may include the security bits described herein, clock signal generator configuration data, and/or other data that may be written to DPE GCS registers 638.

Global timer 644 is capable of interfacing to CDT circuit 620. For example, global timer 644 may be coupled to CDT circuit 620. Global timer 644 is capable of providing a signal that is used by CDT circuit 620 for time-stamping events used for tracing. In one or more example implementations, global timer 644 may be coupled to CDT circuit 620 within other ones of the tiles of logical interface 304. For example, global timer 644 may be coupled to CDT circuit 620 in the example tiles of FIGS. 6A, 6B, and/or 6C. Global timer 644 may also be coupled to the control/debug block.

Referring to the architectures of FIGS. 6A, 6B, and 6C collectively, tile 408 is capable of communicating with DPEs 402 using a variety of different data paths. In an example, tile 408 is capable of communicating with DPEs 402 using DMA engine 612. For example, tile 408 is capable of communicating using DMA engine 612 to the DMA engine of one or more DPEs 402 of DPE array 110. Communication may flow from a DPE 402 to a tile 408 of logical interface 304 or from a tile 408 of logical interface 304 to a DPE 402. In another example, DMA engine 612 is capable of communicating with one or more cores 404 of one or more DPEs 402 of DPE array 110 by way of the stream switches within the respective DPEs. Communication may flow from one or more cores 404 to a tile 408 of logical interface 304 and/or from a tile 408 of logical interface 304 to one or more cores 404 of one or more DPEs 402 of DPE array 110.

In one or more example implementations, each of bitwise interface 610, DMA engine 612, and stream interface 614 may be selectively turned on and connected to physical interface 306 or turned off and disconnected from physical interface 306. As such, any one or more or any combination of bitwise interface 610, DMA engine 612, and stream interface 614 may be connected to physical interface 306 or disconnected from physical interface 306 based on the configuration data for tile 408. In one aspect, such configuration data may be loaded into control registers 636. In another aspect, such configuration data may be provided by way of configuration pins of IC 100.

The particular interface(s) connected to physical interface 306 or disconnected from physical interface 306 may vary from one tile 408 to another. For example, in a first tile 408, a particular combination of one or more interfaces may be connected to physical interface 306 while a different combination of one or more interfaces may be connected to physical interface 306 in a second and different tile 408. Further the particular interface and/or interfaces that are connected and/or disconnected with respect to physical interface 306 may vary based on the particular types of interfaces included in each respective tile 408.

In one example implementation, configuration data for tile 408 enables and connects stream interface 614 to physical interface 306 while bitwise interface 610 and/or DMA engine 612 are disconnected from physical interface 306. For purposes of illustration, stream interface 614 may be connected to physical interface 306 in order to facilitate or access hardened functions in other dies of IC 100 with low-latency.

In another example implementation, configuration data for tile 408 enables and connects DMA engine 612 (e.g., a memory-mapped interface) to physical interface 306 while bitwise interface 610 and/or stream interface 614 are disconnected from physical interface 306. For purposes of illustration, DMA engine 612 may be connected to physical interface 306 to access an external memory in reference to a memory that is located off-chip or off-IC 100 or to access a memory implemented in IC 100 in a different die. Examples of memories, whether implemented in other dies of IC 100 and/or external to IC 100 include, but are not limited to, a RAM (e.g., DDR) and/or a high-bandwidth memory (HBM).

In another example implementation, configuration data for tile 408 enables and connects bitwise interface 610 to physical interface 306 while DMA engine 612 and/or stream interface 614 are disconnected from physical interface 306. For purposes of illustration, bitwise interface 610 may be connected to physical interface 306 to provide error notifications and/or interrupts to other dies of IC 100.

Figure 7:
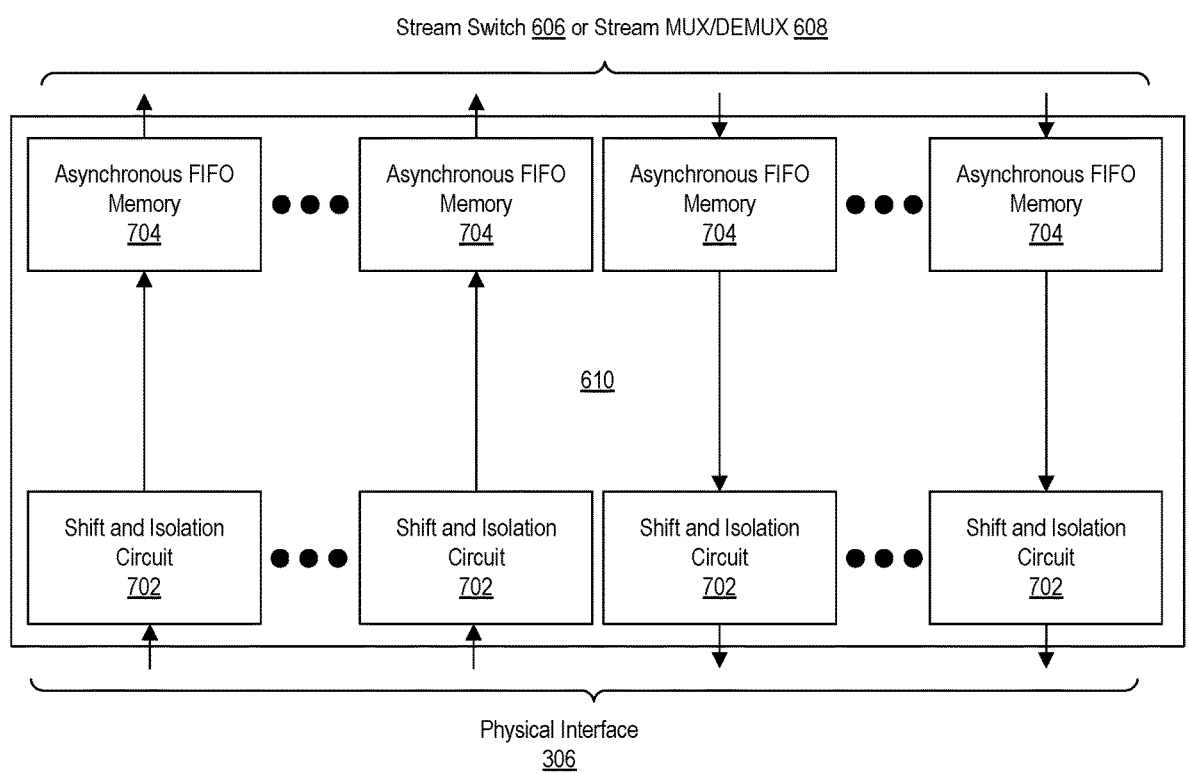
FIG. 7 illustrates an example implementation of an interface of a tile of a logical interface.

FIG. 7 illustrates an example implementation of bitwise interface 610. In the example of FIG. 7, bitwise interface 610 includes a plurality of channels that couple physical interface 306 to stream switch 606 and/or stream multiplexer/demultiplexer 608 depending upon the particular tile architecture that is used. The particular number of channels illustrated in FIG. 7 within bitwise interface 610 is for purposes of illustration and not limitation. In other embodiments, bitwise interface 610 may include fewer or more channels than shown in FIG. 7. Further, while bitwise interface 610 connects to physical interface 306, in one or more other example implementations, bitwise interface 610 is capable of coupling to one or more other systems and/or circuit blocks of IC 100.

In one or more example implementations, physical interface 306 and/or other dies coupled thereto operate at a different reference voltage and a different clock speed than DPEs 402. Accordingly, in the example of FIG. 7, bitwise interface 610 includes a plurality of shift and isolation circuits 702 and a plurality of asynchronous FIFO memories 704. Each of the channels includes a shift isolation circuit 702 and an asynchronous FIFO memory 704. A first subset of the channels convey data from physical interface 306 (and/or other circuitry) to stream switch 606 and/or stream multiplexer/demultiplexer 608. A second subset of the channels convey data from stream switch 606 and/or stream multiplexer/demultiplexer 608 to physical interface 306 and/or other circuitry.

Shift and isolation circuits 702 are capable of interfacing between domains of different voltage. In this case, shift and isolation circuits 702 are capable of providing an interface that transitions between the operating voltage of physical interface 306 and/or other circuitry and the operating voltage of DPEs 402. Asynchronous FIFO memories 704 are capable of interfacing between two different clock domains. In this case, asynchronous FIFO memories 704 are capable of providing an interface that transitions between the clock rate of physical interface 306 or other circuitry and/or other circuitry coupled thereto and the clock rate of DPEs 402.

In one or more example implementations, asynchronous FIFO memories 704 have 32-bit interfaces to DPE array 110. Connections between asynchronous FIFO memories 704 and shift and isolation circuits 702 and connections between shift and isolation circuits 702 and physical interface 306 may be programmable (e.g., configurable) in width. For example, the connections between asynchronous FIFO memories 704 and shift and isolation circuits 702 and the connections between shift and isolation circuits 702 and physical interface 306 may be configured to be 32-bits, 64-bits, or 128-bits in width. As discussed, bitwise interface 610 is configurable by way of memory mapped switch 602 writing configuration data to control registers 636 to achieve the bit-widths described. Using memory mapped switch 602, the side of asynchronous FIFO memories 704 on the side of physical interface 306 may be configurable to use either 32-bits, 64-bits, or 128-bits. The bit widths provided herein are for purposes of illustration. In other embodiments, other bit widths may be used. In any case, the widths described for the various components may be varied based upon configuration data loaded into control registers 636.

Figure 8:
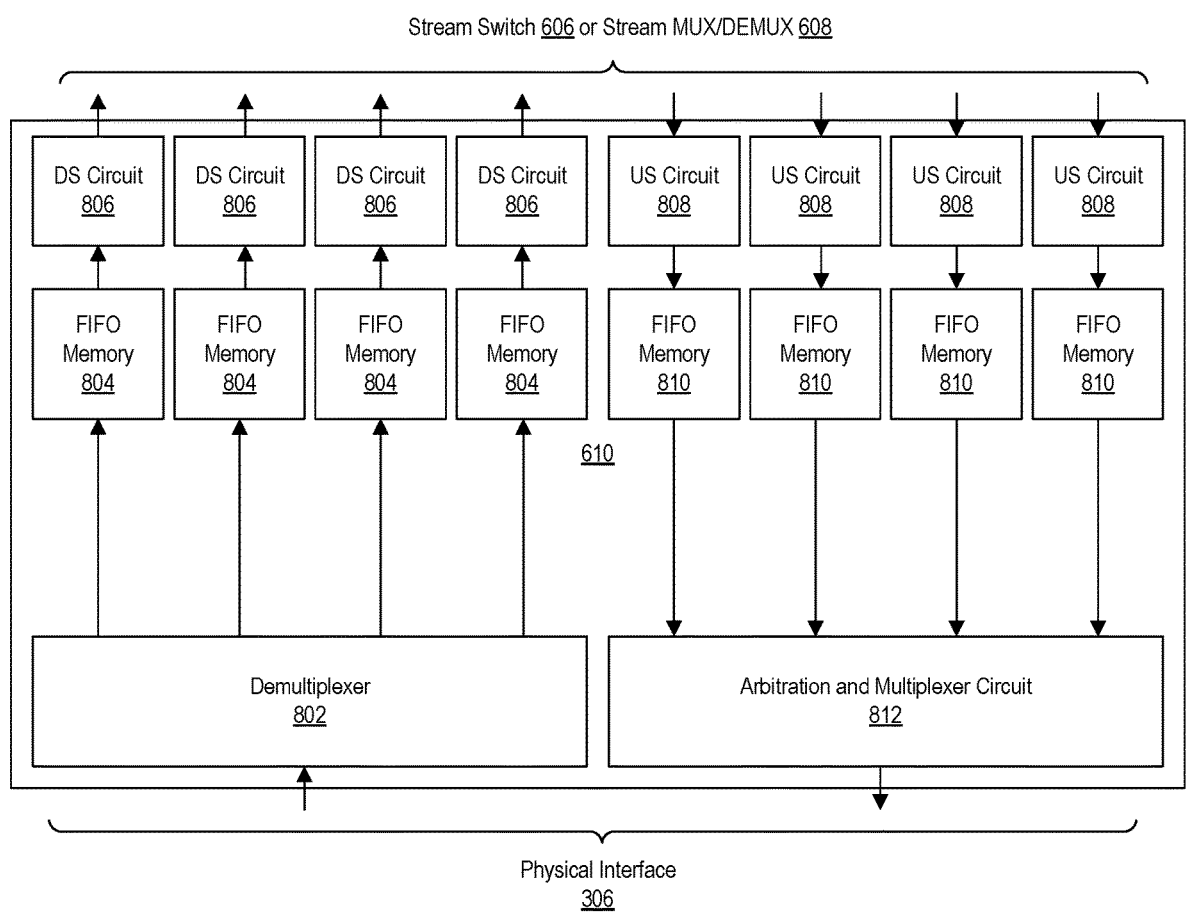
FIG. 8 illustrates another example implementation of an interface of a tile of a logical interface.

FIG. 8 illustrates an example implementation of stream interface 614. In one aspect, DPEs 402 are capable of accessing DMA engine 612 using stream switch 606. DMA engine 612 is capable of converting memory mapped transactions from physical interface 306 to data streams for sending to the DPEs and converting data streams from the DPEs to memory mapped transactions for sending over physical interface 306. In another aspect, the data streams may be directed to stream interface 614.

In the example of FIG. 8, stream interface 614 includes a plurality of channels that couple physical interface 306 to stream switch 606 and/or stream multiplexer/demultiplex 608. Each channel may include a FIFO memory and either an upsize circuit or a downsize circuit. A first subset of the channels convey data from physical interface 306 to stream switch 606 and/or stream multiplexer/demultiplexer 608. A second subset of the channels convey data from stream switch 606 and/or stream multiplexer/demultiplexer 608 to physical interface 306. The particular number of channels illustrated in FIG. 8 within NoC stream interface 614 is for purposes of illustration and not limitation. In other example implementations, stream interface 614 may include fewer or more channels than shown in FIG. 8.

In one or more example implementations, each of upsize circuits 808 (abbreviated as "US circuit" in FIG. 8) is capable of receiving a data stream and increasing the width of the received data stream. For example, each upsize circuit 808 may receive a 32-bit data stream and output a 128-bit data stream to a corresponding FIFO memory 810. Each of FIFO memories 810 is coupled to arbitration and multiplexer circuit 812. Arbitration and multiplexer circuit 812 is capable of arbitrating between the received data streams using a particular arbitration scheme or priority (e.g., round-robin or other style) for providing a resulting output data stream to physical interface 306. Arbitration and multiplexer circuit 812 is capable of handling and accepting a new request every clock cycle. Clock domain crossing between DPEs 402 and physical interface 306 may be handled within tile 408 using FIFO memories 804, for example.

Demultiplexer 802 is capable of receiving a data stream from physical interface 306. For purposes of illustration, the data streams may be 128-bits in width. Clock domain crossing between DPEs 402 and physical interface 306 may be handled within bitwise interface 610 as previously described. Demultiplexer 802 is capable of forwarding the received data stream to one of FIFO memories 804. The particular FIFO memory 804 to which demultiplexer 802 provides the data stream may be encoded within the data stream itself. FIFO memories 804 are coupled to downsize circuits 806 (abbreviated as "DS circuit" in FIG. 8). Downsize circuits 806 are capable of downsizing the received streams to a lesser width after buffering using time-division multiplexing. For example, downsize circuits 806 may downsize a stream from 128 bits in width to 32-bits in width.

As illustrated, downsize circuits 806 and upsize circuits 808 are coupled to stream switch 606 or stream multiplexer/demultiplexer 608 depending upon the particular architecture of the tile of logical interface 304 that is used. FIG. 8 is provided for purposes of illustration and is not intended as a limitation. The order and/or connectivity of components in the channels (e.g., upsize/downsize circuit and FIFO memory may vary).

In one or more other example implementations, bitwise interface 610, as described in connection with FIG. 7, may include upsize circuits and/or downsize circuits as described in connection with FIG. 8. For example, downsize circuits may be included in each channel that conveys data from physical interface 308 (or other circuitry) to stream switch 606 and/or to stream multiplexer/demultiplexer 608. Upsize circuits may be included in each channel that conveys data from stream switch 606 and/or stream multiplexer/demultiplexer 608 to physical interface 306 (or other circuitry).

In one or more other example implementations, though shown as independent elements, each downsize circuit 806 may be combined with the corresponding FIFO memory 804, e.g., as a single block or circuit. Similarly, each upsize circuit 808 may be combined with the corresponding FIFO memory 810, e.g., as a single block or circuit.

Figure 9:
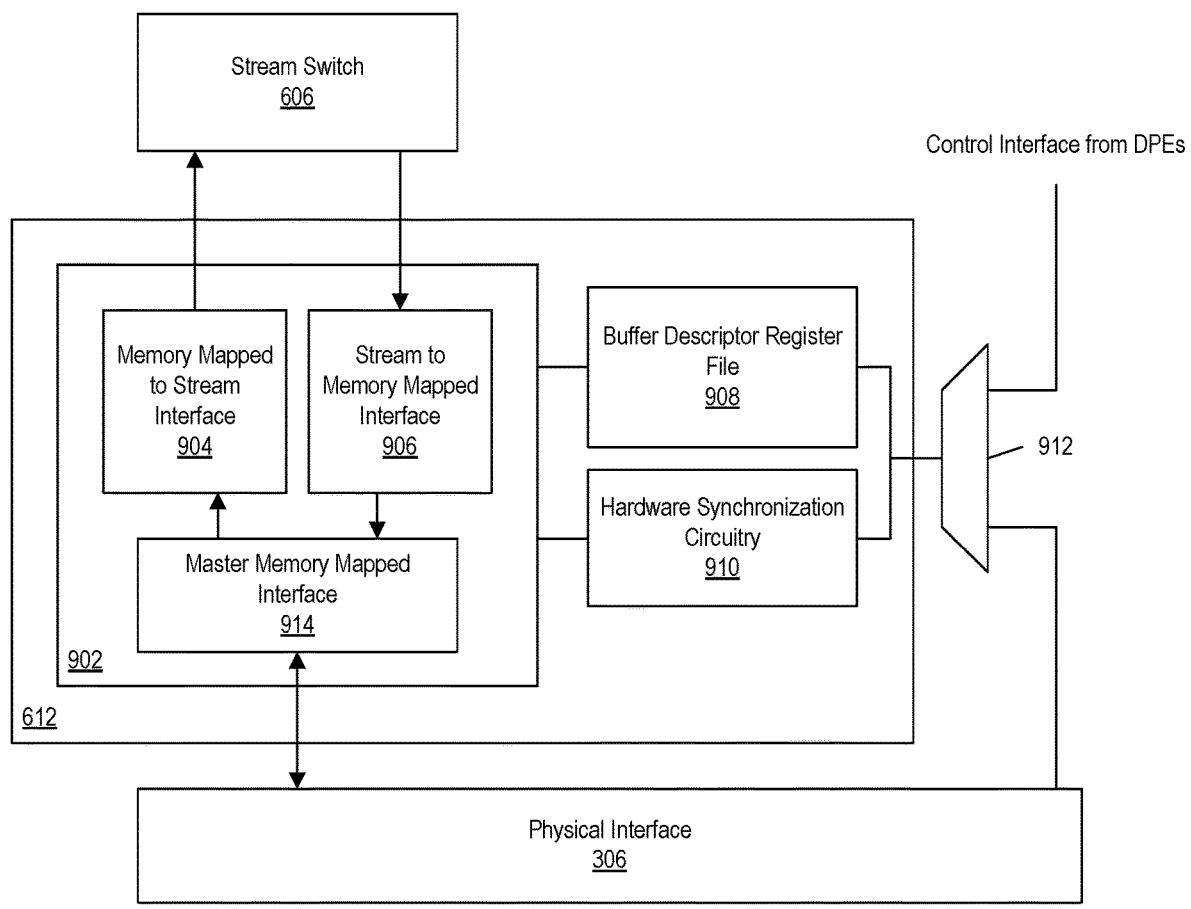
FIG. 9 illustrates an example implementation of direct memory access engine of a tile of a logical interface.

FIG. 9 illustrates an example implementation of DMA engine 612. In the example of FIG. 9, DMA engine 612 includes a DMA controller 902. DMA controller 902 may be divided into two separate modules or interfaces. Each module is capable of operating independently of the other. DMA controller 902 may include a memory mapped to stream interface (interface) 904 and a stream to memory mapped interface (interface) 906. Each of interface 904 and interface 906 may include two or more separate channels. Accordingly, DMA engine 612 is capable of receiving two or more incoming streams from stream switch 606 via interface 906 and sending two or more outgoing streams to stream switch 606 via interface 904. DMA controller 902 further may include a master memory mapped interface 914. Master memory mapped interface 914 couples physical interface 306 to interface 904 and to interface 906.

DMA engine 612 may also include hardware synchronization circuitry 910 and a buffer descriptor register file 908. Hardware synchronization circuitry 910 and buffer descriptor register file 908 may be accessed via multiplexer 912. As such, both hardware synchronization circuitry 910 and buffer descriptor register file 908 may be accessed externally via control interfaces. Examples of such control interfaces include, but are not limited to, a memory mapped interface or a control stream interface from the DPEs 402. An example of a control stream interface of a DPE is a streaming interface output from a core of a DPE.

Hardware synchronization circuitry 910 may be used to synchronize the multiple channels included in DMA engine 612 and/or a channel within DMA engine 612 with a master that polls and drives the lock requests. For example, the master may be another system coupled to DMA engine 612 via physical interface 306. In another example, the master may also receive an interrupt generated by hardware synchronization circuitry 910 within DMA engine 612 when a lock is available.

DMA transfers may be defined by buffer descriptors stored within buffer descriptor register file 908. Interface 906 is capable of requesting read transfers to physical interface 306 based on the information in the buffer descriptors. Outgoing streams to stream switch 606 from interface 904 can be configured as packet-switched or circuit-switched based upon the configuration registers for stream switches.

Figure 10:
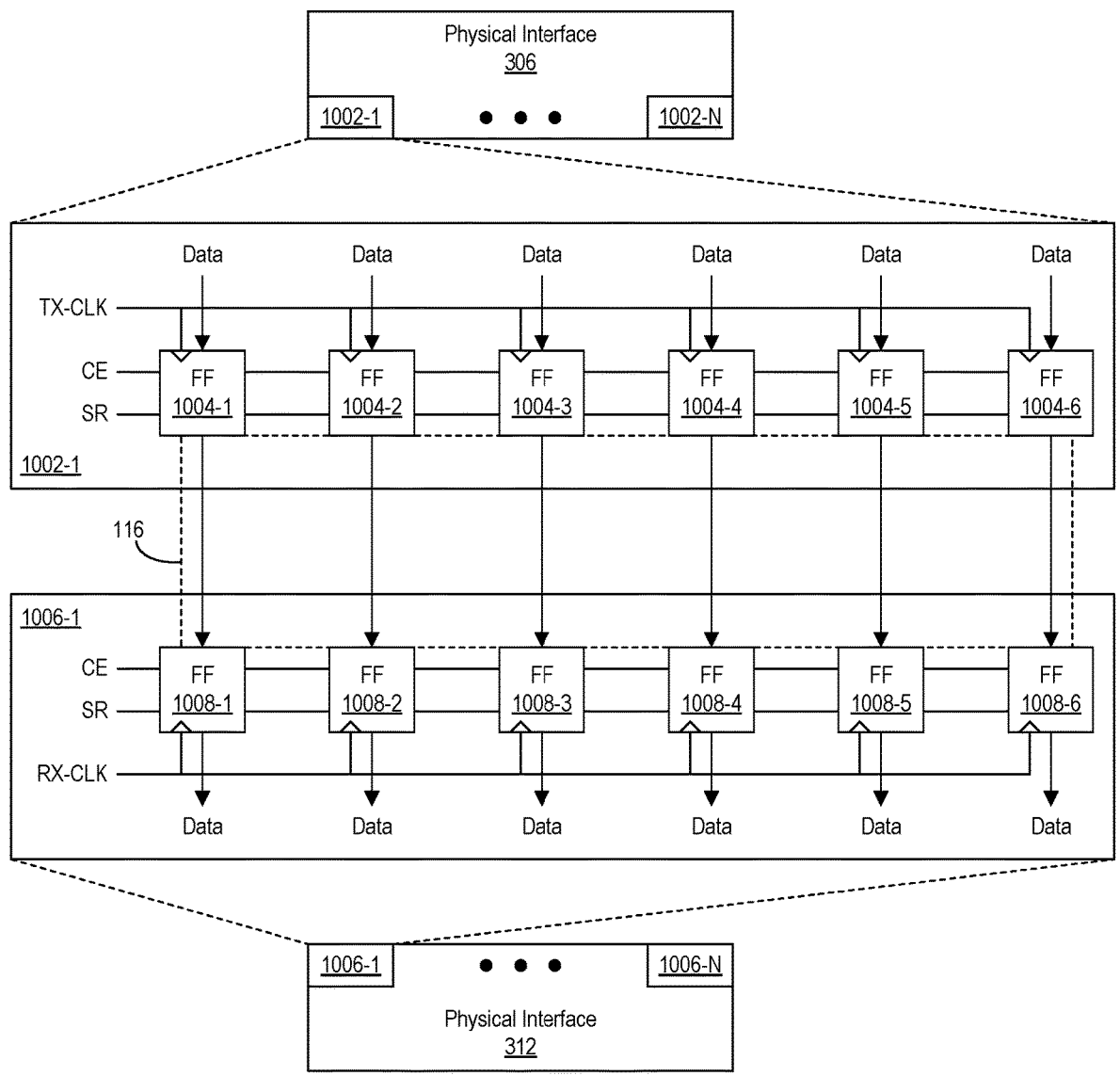
FIG. 10 illustrates an example implementation of physical interfaces for a device having multiple dies.

FIG. 10 illustrates an example implementation of physical interfaces 306 and 312. Physical interface 306 may include a plurality of circuit blocks 1002 (e.g., shown as 1002-1 through 1002-N in FIG. 10). In the example of FIG. 10, physical interface 306 is implemented as a multi-channel interface where each of circuit blocks 1002 corresponds to a channel. Physical interface 312 of die 106 also includes a plurality of circuit blocks 1006 (e.g., shown as 1006-1 through 1006-N). Physical interface 312 is implemented as a multi-channel interface where each of blocks 1006 corresponds to a channel. In the example of FIG. 10, a channel is formed of a pair of circuit blocks, for example, circuit block 1002-1 and circuit block 1006-1, which are also referred to as "corresponding circuit blocks" form a single channel. In an example implementation, each of blocks 1002 and 1004 may be implemented as a Laguna site (as available from Xilinx, Inc. of San Jose, Calif.).

Circuit block 1002-1 includes a plurality of flip-flops 1004 (labeled "FF" in FIG. 10). In the example of FIG. 10, six flip-flops 1004 (e.g., FF 1004-1 through FF 1004-6) form a channel. Each flip-flop 1004 is provided with a clock signal (TX-CLK), a clock-enable signal (CE), and a set-reset (SR) signal. Similarly, circuit block 1006-1 includes a plurality of flip-flops 1008 (labeled "FF" in FIG. 10). In the example of FIG. 10, six flip-flops 1008 (e.g., FF 1008-1 through FF 1008-6) form a channel. Each flip-flop 1008 is provided with a clock signal (RX-CLK), a clock-enable signal (CE), and a set-reset (SR) signal. Each pair of transmit and receive flip-flops (e.g., FF 1004-6 and FF 1008-6) form a cell. Thus, the example channel illustrated in FIG. 10 includes 6 cells.

In the example of FIG. 10, inter-die wires 116 connect flip-flops 1004 of circuit block 1002-1 to flip-flops 1008 of circuit block 1006-1. In one or more example implementations, inter-die wires 116 may be implemented in an interposer as described in connection with FIG. 1. In one or more other example implementations, inter-die wires 116 may be implemented in a bridge die as described in connection with FIG. 2.

In one example implementation, each circuit block 1002 may use a same or common clock signal. In other example implementations, each circuit block 1002 may use a clock signal that is independent of the other circuit blocks 1002. Clock signals that are independent of one another may be clock signals that are not derivatives of one another or that differ in one or more characteristics such as, for example, phase, frequency, duty cycle, etc. In still other example implementations, different groupings of one or more circuit blocks 1002 may utilized a same or common clock signal where the clock signals from one grouping to another are independent of one another. The clock signals provided to circuit blocks 1006 may correspond, or be matched, to those of corresponding circuit blocks 1002. In this regard, the different channels need not be synchronous with one another.

In another example implementation, flip-flops within each circuit block 1002 may be configured to be transmit or receive flip-flops. The corresponding flip-flops in the corresponding circuit block 1006 are configured in the inverse. In the example of FIG. 10, each flip-flop 1004 in circuit block 1002-1 is configured as a transmit flip-flop and each flip-flop 1008 in the corresponding circuit block 1006-1 is configured as a received flip-flop. In another example, each flip-flop 1004 in circuit block 1002-1 may be configured as a receive flip-flop and each flip-flop 1008 in the corresponding circuit block 1006-1 may be configured as a transmit flip-flop. Each circuit block 1002 may be configured independently with the corresponding circuit block 1006 configured in the inverse.

In another example, one or more of flip-flops 1004 of circuit block 1002-1 may be configured as a transmit flip-flop (e.g., FFs 1004-1 and 1004-2) while one or more other ones of flip-flops 1004 (e.g., FFs 1004-3, 1004-4, 1004-5, and 1004-6) are configured as receive flip flops. Corresponding circuit block 1006-1 is configured in the inverse where one or more of flip-flops 1008 may be configured as a receive flip-flop (e.g., FFs 1008-1 and 1008-2) while one or more other ones of flip-flops 1008 (e.g., FFs 1008-3, 1008-4, 1008-5, and 1008-6) are configured as transmit flip flops. In this manner each circuit block 1002 may be configured with a desired number of transmit and receive flip-flops, while each corresponding circuit block 1006 is configured in the inverse.

In one example implementation, any data streams received from an interface of tile 408 (e.g., bitwise interface 610, DMA engine 612, and/or stream interface 614) may be provided to different circuit blocks 1002 with a bit-for-bit (e.g., wire-to-wire) correspondence. For example, a 32-bit data stream from an interface of tile 408 may be provided to physical interface 306 and utilize 6 circuit blocks 1002. A 128-bit stream provided from an interface of tile 408 may be mapped to 22 circuit blocks 1002. It should be appreciated, however, that the number of signal lines (e.g., flip-flops) included in each circuit block 1002 and/or 1006 is for purposes of illustration. In other example implementations, the number of signal lines may be fewer than 6 while in other cases more than 6.

Figure 11:
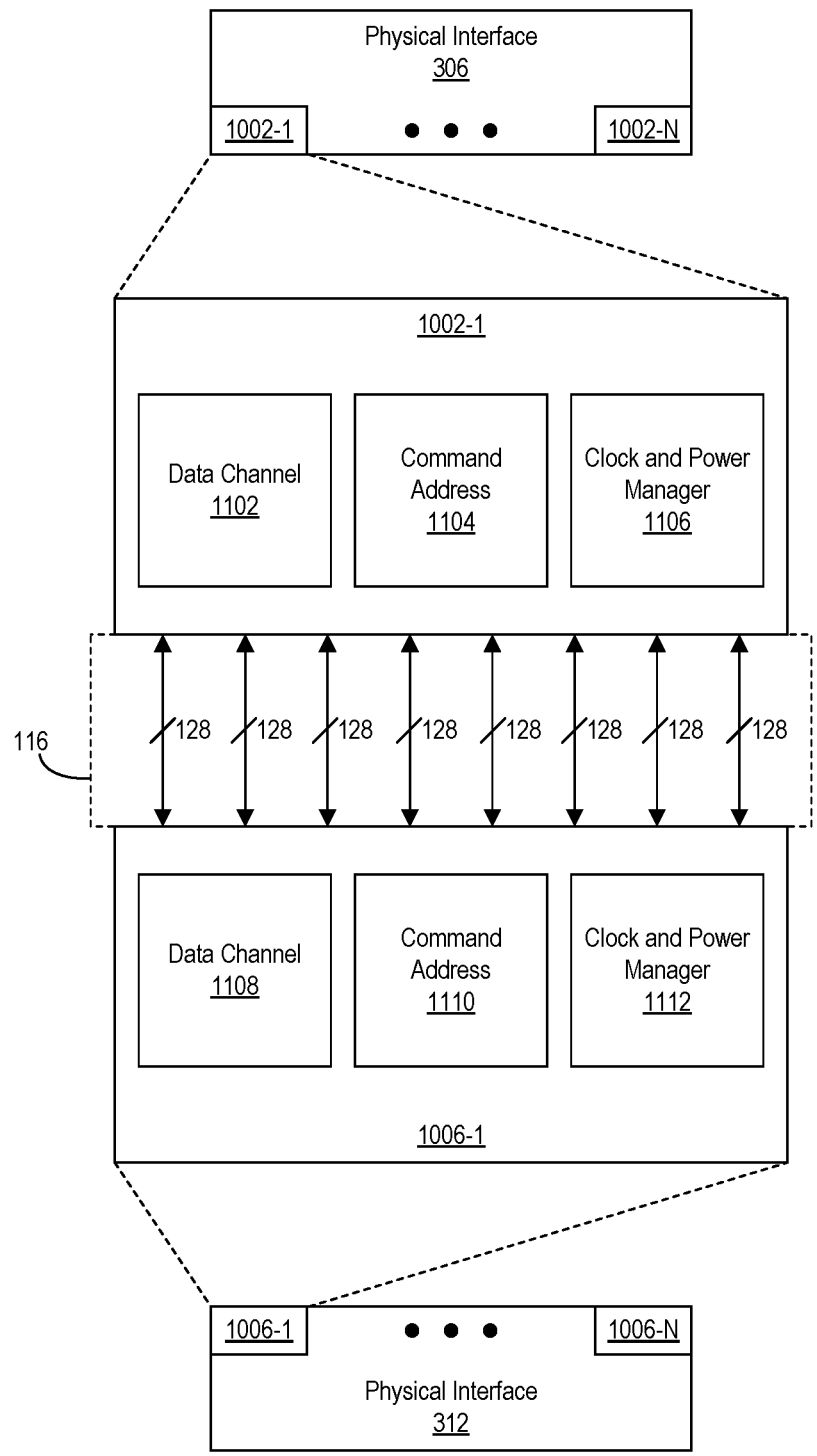
FIG. 11 illustrates another example implementation of physical interfaces for a device having multiple dies.

FIG. 11 illustrates another example implementation of physical interfaces 306 and 312. Physical interfaces 306 and 312 are implemented as multi-channel interfaces. In the example of FIG. 11, circuit blocks 1002 and 1006 are implemented as High Bandwidth Memory (HBM) physical interfaces (PHYs). In example implementations, physical interfaces 306 and 312 may be implemented to conform to the High Bandwidth Memory (HBM) DRAM memory standard (JESD235) of 2013 or the HBM DRAM memory standard (JESD235A) of 2020.

Circuit block 1002-1 includes a data channel circuit 1102, a command address circuit 1104, and a clock and power manager 1106. The corresponding circuit block 1006-1 includes a data channel circuit 1108, a command address circuit 1110, and a clock and power manager circuit 1112. The data channel blocks 1102 and 1108 each provide eight channels with four 32-bit words per channel. The example of FIG. 11 shows that each pair of circuit blocks (e.g., 1002-1 and 1006-1) includes eight channels and, as such, is capable of exchanging 1028 bits of parallel data.

In an example implementation, each of the eight channels may have independent clocking and power management as supported by clock and power managers 1106 and 1112. In this regard, the different channels need not be synchronous with one another. Further, each of the eight channels supports bidirectional communication. In the example of FIG. 11, inter-die wires 116 connect circuit block 1002-1 to circuit block 1006-1. In one or more example implementations, inter-die wires 116 may be implemented in an interposer as described in connection with FIG. 1. In one or more other example implementations, inter-die wires 116 may be implemented in a bridge die as described in connection with FIG. 2.

In one example implementation, any data streams received from an interface of tile 408 (e.g., bitwise interface 610, DMA engine 612, and/or stream interface 614) may be provided to different circuit blocks 1002 with a bit-for-bit (e.g., wire-to-wire) correspondence. For example, a 32-bit data stream output from the interface of tile 408 may be provided to physical interface 306 and utilize one 32-bit word of a channel in circuit block 1002-1. A 128-bit data stream may be mapped to one entire channel of circuit block 1002-1.

Figure 12:
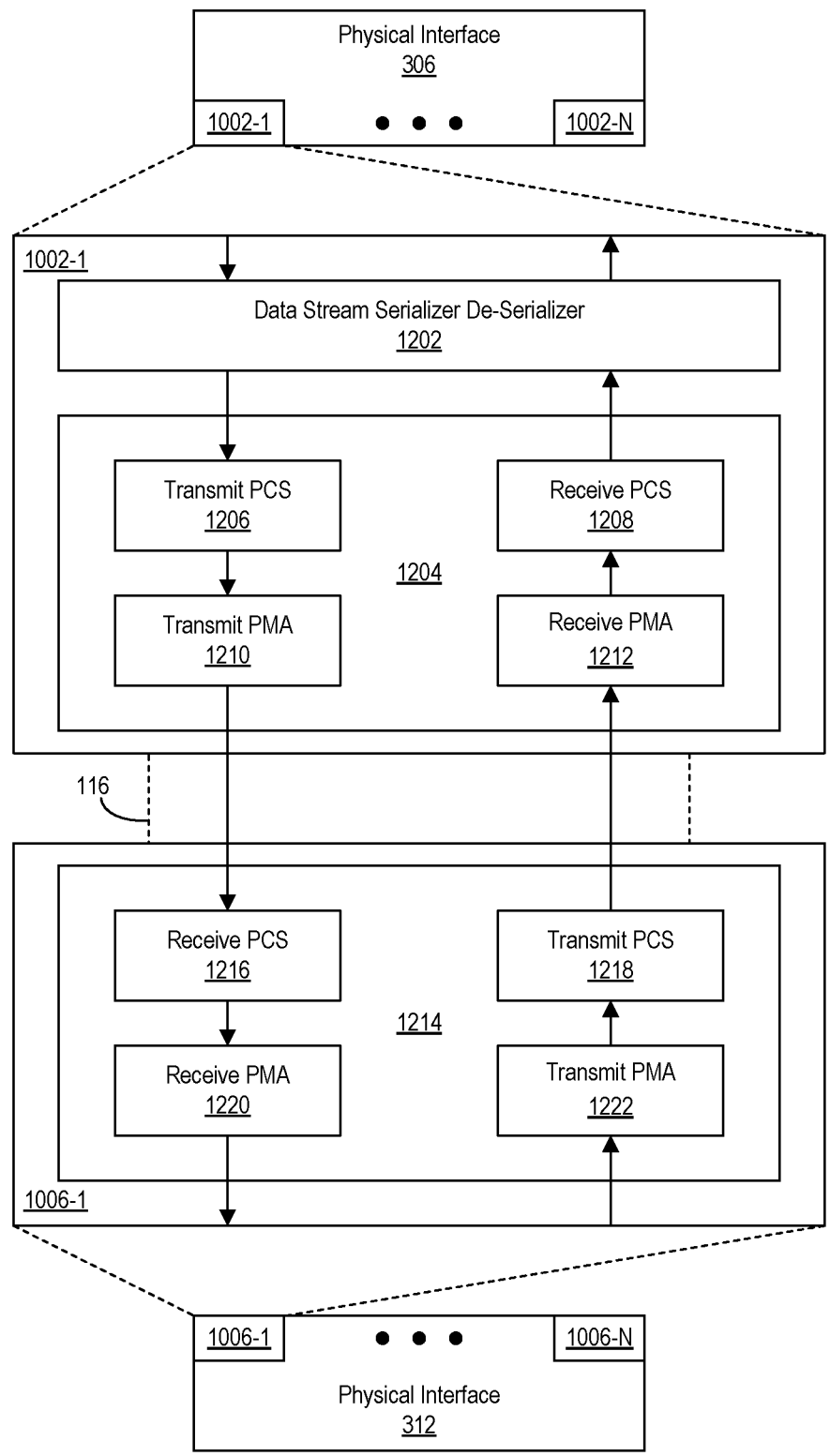
FIG. 12 illustrates another example implementation of physical interfaces for a device having multiple dies.

FIG. 12 illustrates another example implementation of physical interfaces 306 and 312. Physical interface 306 includes one or more circuit blocks 1002, while physical interface 312 includes one or more circuit blocks 1006. In the example of FIG. 12, each circuit block 1002 and 1006 implements a transceiver. The transceiver may be implemented as a high-speed transceiver capable of sending and receiving data at high data rates, e.g., in the Gigabits per second range, where each pair of circuit blocks 1002, 1006 (e.g., 1002-1 and 1006-1) implements a channel. Each channel includes a serialized transmit path and a serialized receive path.

Referring to physical interface 306, circuit blocks 1002 may include a serializer/de-serializer (SERDES) 1202 and a transceiver 1204. SERDES 1202 is capable of receiving a data stream (e.g., parallel data) from an interface of tile 408 (e.g., bitwise interface 610, DMA engine 612, and/or stream interface 614) and converting the data stream to serialized data that is output to transceiver 1204. The received data stream from the interface of tile 408 may be any of a variety of different bit widths. Example bit widths include, but are not limited to, 32, 64, 128, and 256 bits.

SERDES 1202 is further capable of receiving serialized data from transceiver 1204 and converting the received serialized data to a data stream including parallel data. The resulting data stream generated by SERDES 1202 may be any of a variety of bit widths as previously described. SERDES 1202 is capable of outputting the resulting data stream to the interface of tile 408.

Transceiver 1204 may include a transmit Physical Coding Sublayer (PCS) circuit 1206, a receive PCS circuit 1208, a transmit Physical Medium Attachment (PMA) circuit 1210, and a receive PMA 1212. Transmit PCS circuit 1206 is capable of receiving serialized data from SERDES 1202. Transmit PCS circuit 1206 is capable of performing operations such as, for example, data encoding, scrambling, alignment marker insertion, block and symbol redistribution, and lane block synchronization and de-skew. Transmit PMA 1210 receives data from transmit PCS 1206 and is capable of performing operations such as, for example, PMA framing, octet synchronization/detection, and further scrambling. Transmit PMA 1210 is capable of sending the serialized data over an inter-die wire 116 to physical interface 312.

Receive PMA 1212 is capable of receiving data via an inter-die wire 116 from physical interface 312. Receive PMA 1212 is capable of performing operations such as, for example, PMA framing, octet synchronization/detection, and descrambling. Receive PMA 1212 outputs the data to receive PCS 1208. Receive PCS 1208 is capable of performing operations on received data such as, for example, data decoding, descrambling, alignment marker removal, block and symbol redistribution, and lane block synchronization and de-skew. Receive PCS 1208 sends the processed data to SERDES 1202 for conversion to a data stream to be provided to the interface of tile 408.

Circuit blocks 1006 may include a transceiver 1214. Transceiver 1214 may include a receive PCS 1216, a receive PMA 1220, a transmit PMA 1222, and a transmit PCS 1218. Circuit block 1006 may or may not include a SERDES depending on the particular types of circuit blocks implemented in die 106 that are to send data to DPE array 110 and/or receive data from DPE array 110.

In an example implementation, transceiver 1204 and transceiver 1214 each may be implemented as a Gigabit Transceiver (GT) as is available from Xilinx, Inc. of San Jose, Calif. In the example of FIG. 12, inter-die wires 116 connect transceiver 1204 to transceiver 1214 as shown. In one or more example implementations, inter-die wires 116 may be implemented in an interposer as described in connection with FIG. 1. In one or more other example implementations, inter-die wires 116 may be implemented in a bridge die as described in connection with FIG. 2.

The example implementations described in connection with FIGS. 10, 11, and 12 describe several different types of physical interfaces that may be used to communicatively link die 104 with die 106. In other example implementations, physical interface 306 may include a plurality of different types of circuit blocks 1002. For example, physical interface 306 may include one or more of circuit blocks 1002 of FIG. 10, one or more of circuit blocks 1002 of FIG. 11, one or more of circuit blocks 1002 of FIG. 12, or any combination thereof.

In one aspect, in such a heterogeneous implementation of physical interface 306, circuit blocks of like type may be used to connect to one die (e.g., die 106), while circuit blocks of another type (e.g., where "type" in this context refers to a particular implementation such as FIG. 10, 11, or 12) are used to communicate with a different die (e.g., an additional die other than a bridge die).

In another aspect, in a heterogeneous implementation of physical interface 306, circuit blocks of different types may be included and connect to die 106. For example, physical interface may include one or more of circuit blocks 1002 of FIG. 10, one or more of circuit blocks 1002 of FIG. 11, one or more of circuit blocks 1002 of FIG. 12, or any combination thereof, that communicate with a corresponding implementation of physical interface 312 of die 106.

Figure 13:
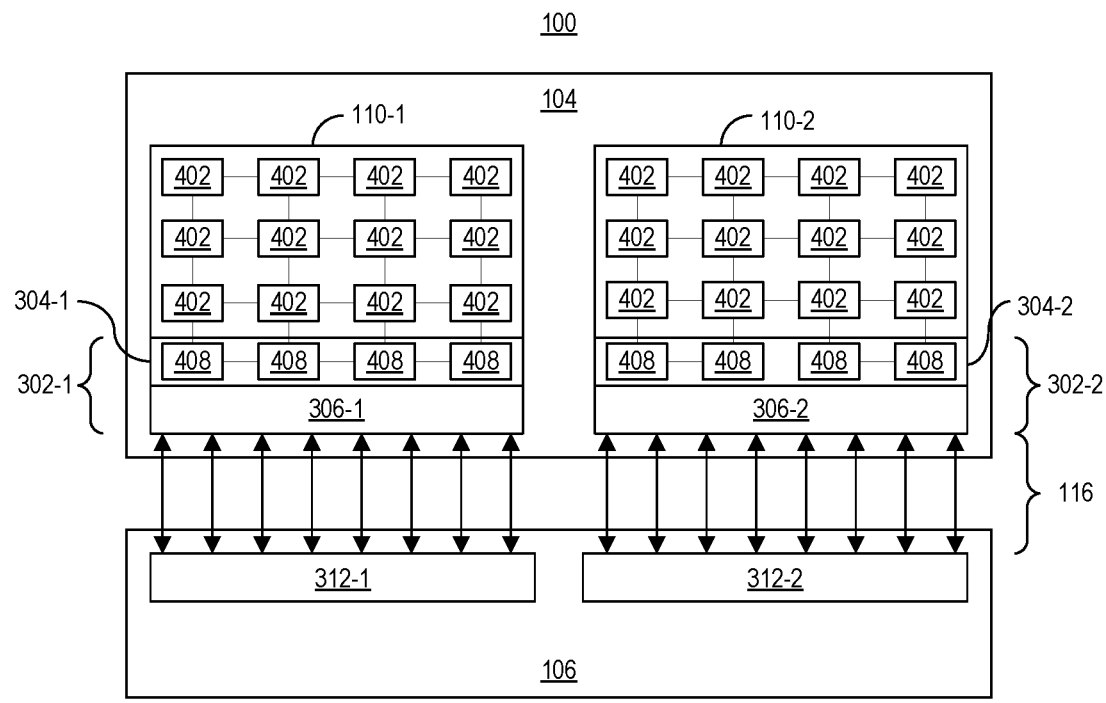
FIG. 13 illustrates an example implementation including a plurality of DPE interfaces.

FIG. 13 illustrates an example implementation including a plurality of DPE interfaces. In the example of FIG. 13, dies 104 and 106 of IC 100 are shown. Inter-die wires may be implemented as described in connection with FIG. 1 or with FIG. 2. As illustrated, die 104 includes two DPE arrays 110-1 and 110-2. DPE array 110-1 is connected to DPE interface 302-1. DPE interface 302-1 includes logical interface 304-1 and physical interface 306-1. DPE array 110-2 is connected to DPE interface 302-2. DPE interface 302-2 includes logical interface 304-2 and physical interface 306-2.

Die 106 includes physical interface 312-1 and physical interface 312-2. Physical interface 312-1 connects to physical interface 306-1. Physical interface 312-2 connects to physical interface 306-2. In one or more example implementations, physical interfaces 306-1, 312-1, 306-2, and 312-2 are implemented as the same interfaces (e.g., matched and as shown in one of FIG. 10, 11, or 12). In one or more other example implementations, physical interfaces 306-1 and 312-1 are the same type of interface (e.g., matched and as shown in one of FIG. 10, 11, or 12) while physical interfaces 306-2 and 312-2 are the same type of interface (e.g., matched) but different from the type of physical interfaces 306-1 and 312-1.

In the example of FIG. 13, including an additional DPE interface increases the bandwidth into and out of die 104s. In the example, DPE array 110-1 and DPE array 110-2, being implemented as separate DPE arrays, are not communicatively linked to one another thereby preventing DPE array 110-1 from communicating with DPE array 110-2. That is, DPEs 402 of DPE array 110-1 cannot communicate with DPEs 402 of DPE array 110-2 without communicating via inter-die wires 116 (e.g., via die 106).

Figure 14:
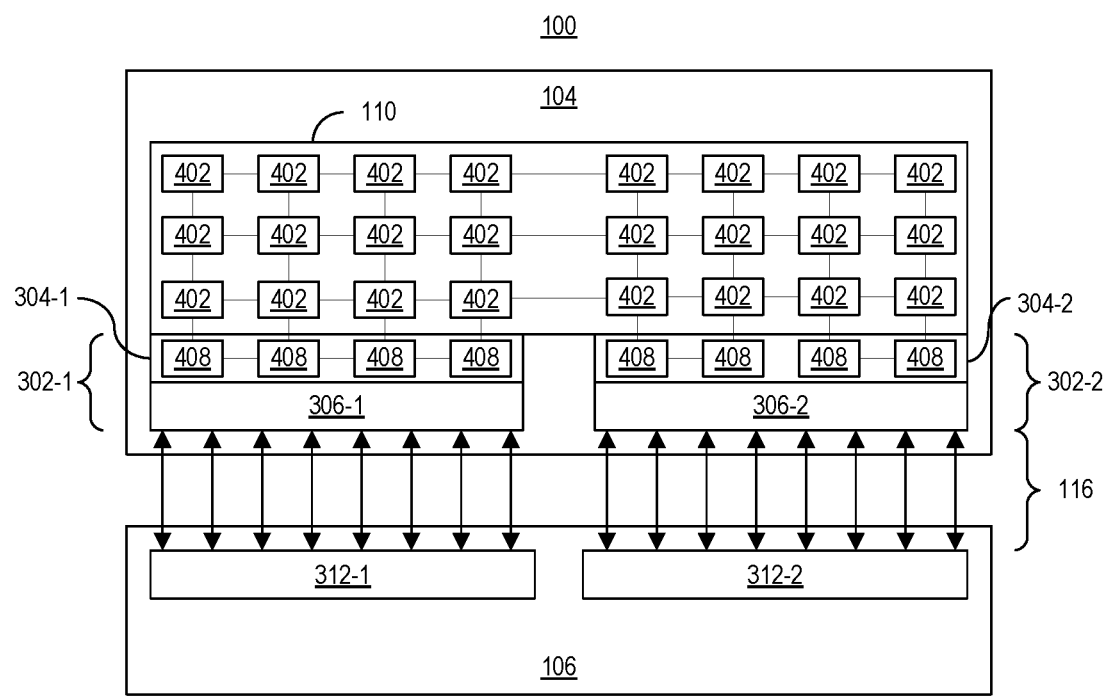
FIG. 14 illustrates another example implementation including a plurality of DPE interfaces.

FIG. 14 illustrates another example implementation including a plurality of DPE interfaces. In the example of FIG. 14, dies 104 and 106 of IC 100 are shown. Inter-die wires may be implemented as described in connection with FIG. 1 or with FIG. 2. As illustrated, die 104 includes one DPE arrays 110. DPE array 110 is connected to DPE interface 302-1 and to DPE interface 302-2. DPE interface 302-1 includes logical interface 304-1 and physical interface 306-1. DPE interface 302-2 includes logical interface 304-2 and physical interface 306-2.

Die 106 includes physical interface 312-1 and physical interface 312-2. Physical interface 312-1 connects to physical interface 306-1. Physical interface 312-2 connects to physical interface 306-2. In one or more example implementations, physical interfaces 306-1, 312-1, 306-2, and 312-2 are implemented as the same interfaces (e.g., matched and as shown in one of FIG. 10, 11, or 12). In one or more other example implementations, physical interfaces 306-1 and 312-1 are the same type of interface (e.g., matched and as shown in one of FIG. 10, 11, or 12) while physical interfaces 306-2 and 312-2 are the same type of interface (e.g., matched) but different from the type of physical interfaces 306-1 and 312-1.

In the example of FIG. 14, including an additional DPE interface increases the bandwidth into and out from die 104. In the example, since DPE array 110 is implemented as a single DPE array, each DPE 402 is capable of communicating with each other DPE 402. Communications between DPEs 402 and logical interfaces 304-1 and 304-2 occur via the DPEs 402 directly above a tile 408. The example of FIG. 14 allows DPEs 402 located above logical interface 304-1 to communicate with DPEs 402 above logical interface 304-2 and vice versa. In such embodiments, clusters of DPEs 402 may be formed without limitation as to which of logical interfaces 304-1 or 304-2 may be used or connected to the cluster. That is, a cluster of DPEs 402 may include one or more DPEs 402 or a column of DPEs 402 above logical interface 304-1 and one or more DPEs 402 or a column of DPEs 402 above logical interface 304-2.

Figure 15:
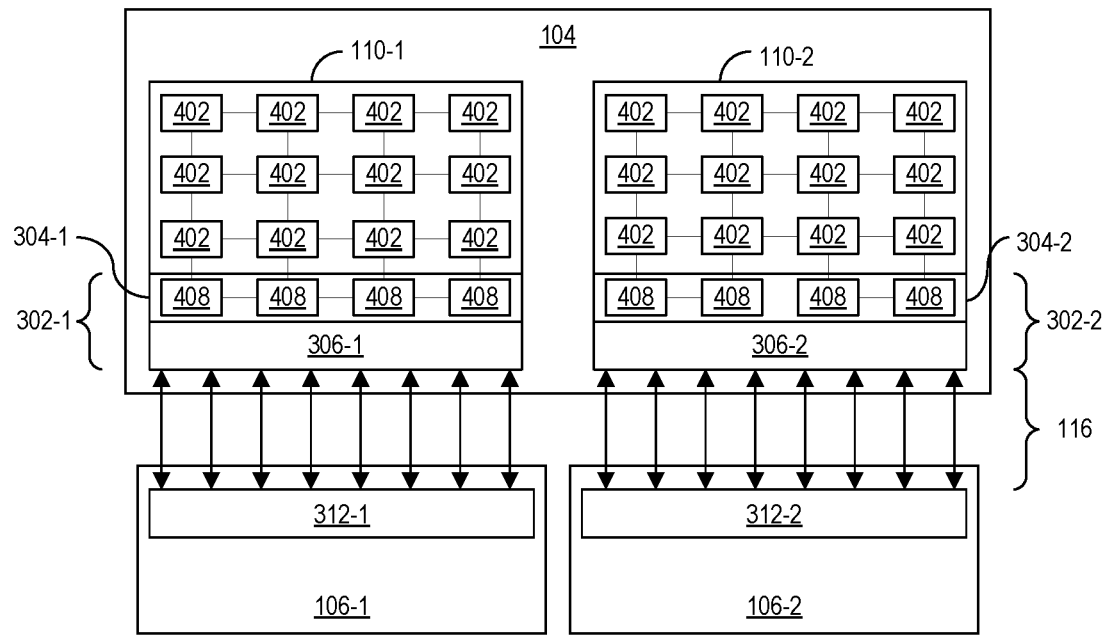
FIG. 15 illustrates another example implementation including a plurality of DPE interfaces.

FIG. 15 illustrates another example implementation including a plurality of DPE interfaces. The example of FIG. 15 is similar to the example of FIG. 13 with the exception that three dies are included in IC 100. IC 100 includes dies 104, 106-1 and 106-2. Physical interface 312-1 is implemented in die 106-1. Physical interface 312-2 is implemented in die 106-2. As such, DPE array 110-1 is only able to communicate with die 106-1 while DPE array 110-2 is only able to communicate with die 106-2. Still, the additional DPE interface increases bandwidth into and out of die 104.

Figure 16:
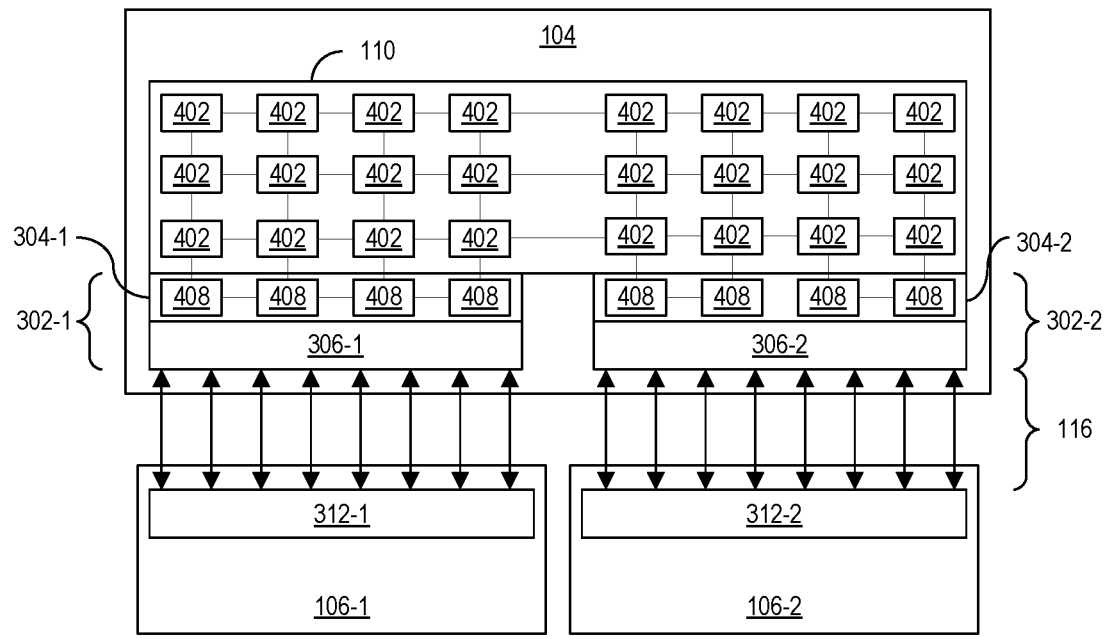
FIG. 16 illustrates another example implementation including a plurality of DPE interfaces.

FIG. 16 illustrates another example implementation including a plurality of DPE interfaces. The example of FIG. 16 is similar to the example of FIG. 14 with the exception that three dies are included in IC 100. IC 100 includes dies 104, 106-1 and 106-2. Physical interface 312-1 is implemented in die 106-1. Physical interface 312-2 is implemented in die 106-2. In the example of FIG. 16, any one or more of DPEs 402 is capable of communicating with die 106-1, die 106-2, or both. The additional DPE interface increases bandwidth into and out of die 104.

Figure 17:
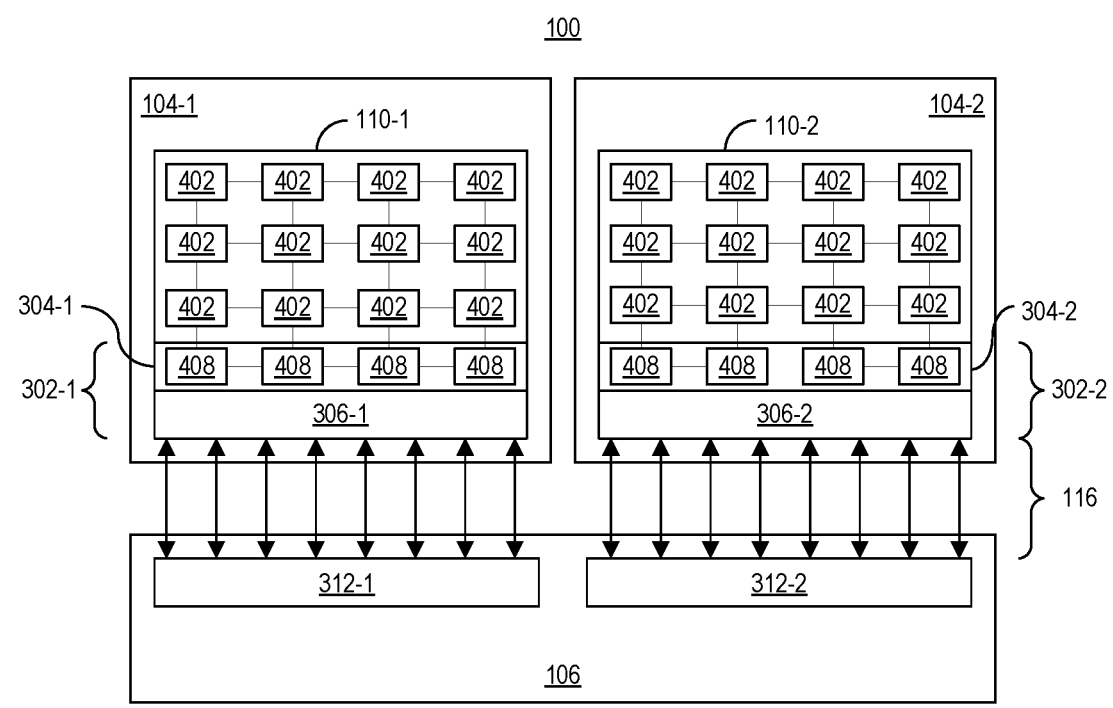
FIG. 17 illustrates another example implementation including a plurality of DPE interfaces.

FIG. 17 illustrates another example implementation including a plurality of DPE interfaces. In the example of FIG. 17, two dies 104, shown as die 104-1 and die 104-2, are shown including different DPE arrays. Dies 104-1 and 104-2 connect to die 106 of IC 100. Inter-die wires may be implemented as described in connection with FIG. 1 or with FIG. 2. As illustrated, die 104-1 includes DPE array 110-1. Die 104-2 includes DPE array 110-2. DPE array 110-1 is connected to DPE interface 302-1. DPE array 110-2 is connected to DPE interface 302-2. DPE interface 302-1 includes logical interface 304-1 and physical interface 306-1. DPE interface 302-2 includes logical interface 304-2 and physical interface 306-2.

Die 106 includes physical interface 312-1 and physical interface 312-2. Physical interface 312-1 connects to physical interface 306-1. Physical interface 312-2 connects to physical interface 306-2. In one or more example implementations, physical interfaces 306-1, 312-1, 306-2, and 312-2 are implemented as the same interfaces (e.g., matched and as shown in one of FIG. 10, 11, or 12). In one or more other example implementations, physical interfaces 306-1 and 312-1 are the same type of interface (e.g., matched and as shown in one of FIG. 10, 11, or 12) while physical interfaces 306-2 and 312-2 are the same type of interface (e.g., matched) but different from the type of physical interfaces 306-1 and 312-1.

In the example of FIG. 17, including an additional DPE interface increases the bandwidth into and out from each DPE array 110-1 and 110-2. Further, the example of FIG. 17 allows each DPE array 110 to operate in isolation from the other. This allows, for example, one application or user to utilize DPE array 110-1 while another different application and/or user uses DPE array 110-2, with each DPE array being physical separated from the other.

The examples provided in connection with FIGS. 13-17 illustrate various multi-die IC implementations including one or more DPE arrays. It should be appreciated that in one or more of the examples described herein, a die including a DPE array may include only circuitry for, or corresponding to, the DPE array and the DPE interface contained therein. That is, such dies may be dedicated or special-purpose DPE array dies. In other examples, the dies including a DPE array and DPE interface may include additional circuitry that operates in a coordinated manner with the DPE array and/or DPE interface. Further, the number of dies shown in the examples of FIGS. 13-17 is for purposes of illustration only. Additional DPE array dies and/or other dies may be included where each die is capable of communicating with one or more other dies via suitable interfaces as described herein.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, when a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The corresponding structures, materials, acts, and equivalents of all means or step plus function elements that may be found in the claims below are intended to include any structure, material, or act for performing the function in combination with other claimed elements as specifically claimed.

In one or more example implementations, a multi-die IC includes an interposer and a first die coupled to the interposer. The first die includes a DPE array, wherein the DPE array includes a plurality of DPEs and a DPE interface coupled to the plurality of DPEs. The DPE interface has a logical interface and a physical interface. The multi-die IC also can include a second die coupled to the interposer and having a die interface. The DPE interface and the die interface are configured to communicate through the interposer.

The foregoing and other implementations can each optionally include one or more of the following features, alone or in combination. Some example implementations include all the following features in combination.

In another aspect, the logical interface of the DPE interface includes a plurality of tiles, wherein each tile is configured to communicate with a subset of the plurality of DPEs of the DPE array.

In another aspect, the physical interface includes a plurality of circuit blocks coupled to the plurality of tiles of the logical interface.

In another aspect, the plurality of circuit blocks of the physical interface include at least a first circuit block implementing one or more parallel, multi-bit channels and a second circuit block implementing a transceiver configured for serial operation.

In another aspect, at least one of the plurality of circuit blocks of the physical interface implements a parallel, multi-bit channel.

In another aspect, each of the circuit blocks of the physical interface is configured to operate independently.

In another aspect, at least one of the plurality of circuit blocks of the physical interface implements a high bandwidth memory interface.

In another aspect, at least one of the plurality of circuit blocks of the physical interface includes a transceiver configured for serial operation.

In another aspect, the at least one of the circuit blocks of the physical interface includes a serializer/de-serializer circuit coupled to the transceiver. The serializer/de-serializer circuit is configured to generate first serialized data from a first data stream received from a selected tile of the logical interface and provide the first serialized data to the transceiver. The serializer/de-serializer circuit also is configured to generate a second data stream from second serialized data received from the transceiver and provide the second data stream to the selected tile of the logical interface.

In another aspect, the multi-die IC includes a package substrate coupled to the interposer.

In another aspect, the first die and the second die are in different clock domains.

In one or more other example implementations, a multi-die IC includes a package substrate, a first die coupled to the package substrate, wherein the first die is configured as an interconnect bridge, and a second die coupled to the package substrate and the first die. The second die includes a DPE array, wherein the DPE array includes a plurality of DPEs and a DPE interface coupled to the plurality of DPEs. The DPE interface has a logical interface and a physical interface. The multi-die IC also can include a third die coupled to the package substrate and the first die, wherein the third die includes a die interface. The DPE interface and the die interface are configured to communicate through the first die.

The foregoing and other implementations can each optionally include one or more of the following features, alone or in combination. Some example implementations include all the following features in combination.

In another aspect, the logical interface of the DPE interface includes a plurality of tiles, wherein each tile is configured to communicate with a subset of the plurality of DPEs of the DPE array.

In another aspect, the physical interface includes a plurality of circuit blocks coupled to the plurality of tiles of the logical interface.

In another aspect, at least one of the plurality of circuit blocks of the physical interface implements a parallel, multi-bit channel.

In another aspect, each of the circuit blocks of the physical interface is configured to operate independently.

In another aspect, at least one of the plurality of circuit blocks of the physical interface implements a high bandwidth memory interface.

In another aspect, at least one of the plurality of circuit blocks of the physical interface includes a transceiver configured for serial operation.

In another aspect, the at least one of the circuit blocks of the physical interface includes a serializer/de-serializer circuit coupled to the transceiver. The serializer/de-serializer circuit is configured to generate first serialized data from a first data stream received from a selected tile of the logical interface and provide the first serialized data to the transceiver. The serializer/de-serializer circuit also can be configured to generate a second data stream from second serialized data received from the transceiver and provide the second data stream to the selected tile of the logical interface.

In another aspect, the first die and the third die are in different clock domains.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A multi-die integrated circuit, comprising:
an interposer;
a first die coupled to the interposer, wherein the first die includes a data processing engine (DPE) array, wherein the DPE array includes a plurality of DPEs arranged in a grid having a plurality of rows and columns of DPEs and a DPE interface coupled to the plurality of DPEs, the DPE interface having a logical interface and a physical interface;
a second die coupled to the interposer and having a die interface;
wherein the DPE interface and the die interface are configured to communicate through the interposer via one or more inter-die wires;
wherein the logical interface of the DPE interface includes a plurality of tiles, wherein each tile includes a stream switch configured to communicate with a subset of the plurality of DPEs of the DPE array and stream switches of adjacent tiles of the DPE interface; and
wherein the physical interface includes a plurality of circuit blocks coupled to the plurality of tiles of the logical interface and each circuit block of the plurality of circuit blocks of the physical interface couples to the one or more inter-die wires.

2. The multi-die integrated circuit of claim 1, wherein the interposer is a passive die.

3. The multi-die integrated circuit of claim 1, wherein the plurality of circuit blocks of the physical interface include at least a first circuit block implementing one or more parallel, multi-bit channels and a second circuit block implementing a transceiver configured for serial operation.

4. The multi-die integrated circuit of claim 1, wherein at least one of the plurality of circuit blocks of the physical interface implements a parallel, multi-bit channel.

5. The multi-die integrated circuit of claim 1, wherein at least one of the plurality of circuit blocks of the physical interface implements a high bandwidth memory interface.

6. The multi-die integrated circuit of claim 1, wherein at least one of the plurality of circuit blocks of the physical interface includes a transceiver configured to implement a channel having a serialized transmit path and a serialized receive path.

7. The multi-die integrated circuit of claim 6, wherein the at least one of the plurality of circuit blocks of the physical interface comprises:
a serializer/de-serializer circuit coupled to the transceiver, wherein the serializer/de-serializer circuit is configured to:
generate first serialized data from a first data stream received from a selected tile of the logical interface and provide the first serialized data to the transceiver; and
generate a second data stream from second serialized data received from the transceiver and provide the second data stream to the selected tile of the logical interface.

8. The multi-die integrated circuit of claim 1, further comprising:
a package substrate coupled to the interposer.

9. The multi-die integrated circuit of claim 1, wherein the first die and the second die are in different clock domains.

10. The multi-die integrated circuit of claim 1, wherein the first die and the second die are in different power domains.

11. The multi-die integrated circuit of claim 1, wherein the first die and the second die are implemented using different process technology.

12. A multi-die integrated circuit, comprising:
a package substrate;
a first die coupled to the package substrate, wherein the first die is configured as an interconnect bridge;
a second die coupled to the package substrate and the first die, wherein the second die includes a data processing engine (DPE) array, wherein the DPE array includes a plurality of DPEs arranged in a grid having a plurality of rows and columns of DPEs and a DPE interface coupled to the plurality of DPEs, the DPE interface having a logical interface and a physical interface;
a third die coupled to the package substrate and the first die, wherein the third die includes a die interface; and
wherein the DPE interface and the die interface are configured to communicate through the first die via one or more inter-die wires;
wherein the logical interface of the DPE interface includes a plurality of tiles, wherein each tile includes a stream switch configured to communicate with a subset of the plurality of DPEs of the DPE array and stream switches of adjacent tiles of the DPE interface; and
wherein the physical interface includes a plurality of circuit blocks coupled to the plurality of tiles of the logical interface and each circuit block of the plurality of circuit blocks of the physical interface couples to the one or more inter-die wires.

13. The multi-die integrated circuit of claim 12, wherein at least one of the plurality of circuit blocks of the physical interface implements a parallel, multi-bit channel.

14. The multi-die integrated circuit of claim 12, wherein at least one of the plurality of circuit blocks of the physical interface implements a high bandwidth memory interface.

15. The multi-die integrated circuit of claim 12, wherein at least one of the plurality of circuit blocks of the physical interface includes a transceiver configured to implement a channel having a serialized transmit path and a serialized receive path.

16. The multi-die integrated circuit of claim 15, wherein the at least one of the plurality of circuit blocks of the physical interface comprises:
a serializer/de-serializer circuit coupled to the transceiver, wherein the serializer/de-serializer circuit is configured to:
generate first serialized data from a first data stream received from a selected tile of the logical interface and provide the first serialized data to the transceiver; and
generate a second data stream from second serialized data received from the transceiver and provide the second data stream to the selected tile of the logical interface.

17. The multi-die integrated circuit of claim 12, wherein the second die and the third die are in different clock domains.

18. The multi-die integrated circuit of claim 12, wherein the second die and the third die are in different power domains.

19. The multi-die integrated circuit of claim 12, wherein the second die and the third die are implemented using different process technology.

* * * * *